US009705344B2

(12) United States Patent
Navid

(10) Patent No.: US 9,705,344 B2
(45) Date of Patent: *Jul. 11, 2017

(54) VIDEO GAME CONTROLLER CHARGING SYSTEM HAVING A DOCKING STRUCTURE

(71) Applicant: NYKO TECHNOLOGIES, INC., Los Angeles, CA (US)

(72) Inventor: Amir Navid, Sherman Oaks, CA (US)

(73) Assignee: NYKO TECHNOLOGIES, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,606

(22) Filed: Nov. 2, 2015

(65) Prior Publication Data

US 2016/0226274 A1    Aug. 4, 2016

Related U.S. Application Data

(63) Continuation of application No. 14/158,703, filed on Jan. 17, 2014, now Pat. No. 9,174,121, which is a
(Continued)

(51) Int. Cl.
*G07F 17/32* (2006.01)
*H02J 7/00* (2006.01)
(Continued)

(52) U.S. Cl.
CPC ............ *H02J 7/0027* (2013.01); *A63F 13/02* (2013.01); *H01R 31/06* (2013.01); *H02J 7/0044* (2013.01); *H02J 7/0045* (2013.01)

(58) Field of Classification Search
CPC ........... A63F 13/06; A63F 13/10; G07F 17/32
See application file for complete search history.

(56) References Cited

U.S. PATENT DOCUMENTS

D241,555 S    9/1976 Goldman et al.
4,288,733 A    9/1981 Bilanceri et al.
(Continued)

FOREIGN PATENT DOCUMENTS

WO    WO 2009/038713 A1    3/2009
WO    WO 2007/078312 A1    7/2012

OTHER PUBLICATIONS

International Search Report, International Application No. PCT/US 06/40118, Dated Nov. 28, 2007.
(Continued)

*Primary Examiner* — Omkar Deodhar
(74) *Attorney, Agent, or Firm* — Lewis Roca Rothgerber Christie LLP

(57) ABSTRACT

A video game controller charging system is provided. The video game controller charging system includes a base; at least one structure on the base for providing physical support to at least one video game controller while it is being charged; and at least one DC port on the base configured to couple to and provide DC power to a power input port of the at least one video game controller. The video game controller charging system may also include a current detector, a charging status indicator, at least one docking bay, and/or an AC-to-DC converter adapted to convert externally supplied power to the DC power provided to the power input port of at least one video game controller. The base of a charging station may include a recess having at least one electrical contact and a power input for connection to a power supply.

22 Claims, 23 Drawing Sheets

Related U.S. Application Data continuation of application No. 13/769,709, filed on Feb. 18, 2013, now Pat. No. 8,633,675, which is a continuation of application No. 13/417,147, filed on Mar. 9, 2012, now Pat. No. 8,536,832, which is a continuation of application No. 12/044,295, filed on Mar. 7, 2008, now Pat. No. 8,143,848, which is a continuation-in-part of application No. 11/581,137, filed on Oct. 13, 2006, now abandoned.

(60) Provisional application No. 60/982,364, filed on Oct. 24, 2007.

(51) Int. Cl.
  *H01R 31/06* (2006.01)
  *A63F 13/98* (2014.01)

(56) References Cited

U.S. PATENT DOCUMENTS

| | | | |
|---|---|---|---|
| D278,426 S | 4/1985 | Lanci et al. |
| 4,641,077 A | 2/1987 | Pascaloff |
| 5,028,859 A | 7/1991 | Johnson et al. |
| 5,059,885 A | 10/1991 | Weiss et al. |
| 5,124,532 A | 6/1992 | Hafey et al. |
| 5,187,422 A | 2/1993 | Izenbaard et al. |
| 5,229,701 A | 7/1993 | Leman et al. |
| 5,317,691 A | 5/1994 | Traeger |
| 5,327,067 A | 7/1994 | Scholder |
| D349,485 S | 8/1994 | Richards et al. |
| 5,547,399 A | 8/1996 | Naghi et al. |
| 5,594,314 A | 1/1997 | Hagiuda et al. |
| 5,656,914 A | 8/1997 | Nagele et al. |
| 5,661,391 A | 8/1997 | Ito et al. |
| 5,689,171 A | 11/1997 | Ludewig |
| 5,734,253 A | 3/1998 | Brake et al. |
| 5,734,254 A | 3/1998 | Stephens |
| 5,828,966 A | 10/1998 | Davis et al. |
| 5,847,545 A | 12/1998 | Chen et al. |
| D414,180 S | 9/1999 | Waldner |
| 6,018,227 A | 1/2000 | Kumar et al. |
| 6,061,261 A | 5/2000 | Chen et al. |
| 6,204,632 B1 | 3/2001 | Nierescher et al. |
| D444,472 S | 7/2001 | Russell et al. |
| 6,313,604 B1 | 11/2001 | Chen |
| 6,321,340 B1 | 11/2001 | Shin et al. |
| 6,329,786 B1 | 12/2001 | Ono |
| 6,362,987 B1 | 3/2002 | Yurek et al. |
| 6,424,525 B1 | 7/2002 | MacLeod et al. |
| D461,814 S | 8/2002 | Felix et al. |
| 6,459,882 B1 | 10/2002 | Palermo et al. |
| D465,532 S | 11/2002 | Hussaini et al. |
| D469,439 S | 1/2003 | Bradley |
| 6,522,104 B1 | 2/2003 | Drori |
| 6,560,102 B1 | 5/2003 | Tong et al. |
| D476,659 S | 7/2003 | Ying et al. |
| 6,597,152 B1 | 7/2003 | Jacobs et al. |
| 6,614,206 B1 | 9/2003 | Wong et al. |
| 6,632,098 B1 | 10/2003 | Wong et al. |
| 6,669,513 B2 | 12/2003 | Huang |
| D489,322 S | 5/2004 | Sawai et al. |
| 6,752,514 B2 | 6/2004 | Parker |
| 6,765,366 B2 | 7/2004 | Maggert et al. |
| 6,790,062 B1 | 9/2004 | Liao |
| 6,811,444 B2 | 11/2004 | Geyer |
| 6,812,971 B2 | 11/2004 | Terane |
| 6,842,356 B2 | 1/2005 | Hsu |
| D508,916 S | 8/2005 | Lee |
| D509,788 S | 9/2005 | Schlieffers et al. |
| D510,562 S | 10/2005 | Lodato et al. |
| D511,520 S | 11/2005 | Hussaini et al. |
| 6,991,483 B1 | 1/2006 | Milan et al. |
| 6,992,462 B1 | 1/2006 | Hussaini et al. |
| D519,921 S | 5/2006 | Claxton et al. |
| D520,447 S | 5/2006 | Liu |
| 7,054,177 B2 | 5/2006 | Wu |
| D526,995 S | 8/2006 | Claxton et al. |
| D530,667 S | 10/2006 | Viduya et al. |
| 7,140,922 B2 | 11/2006 | Luu et al. |
| 7,151,357 B2 | 12/2006 | Xian et al. |
| 7,254,366 B2 | 8/2007 | Palermo et al. |
| D555,589 S | 11/2007 | Hussaini et al. |
| D559,484 S | 1/2008 | Fjellman |
| D562,230 S | 2/2008 | Houghton |
| D563,315 S | 3/2008 | Kingston et al. |
| 7,535,195 B1 | 5/2009 | Horovitz et al. |
| 7,659,696 B2 | 2/2010 | Zeiler et al. |
| 7,705,559 B2 | 4/2010 | Powell et al. |
| 7,750,599 B2 | 7/2010 | Kaji et al. |
| 7,772,802 B2 | 8/2010 | Manico et al. |
| 7,775,884 B1 | 8/2010 | McCauley |
| 7,816,886 B2 | 10/2010 | Brandon, II et al. |
| 7,863,860 B2 | 1/2011 | Lin |
| 7,942,747 B2 | 5/2011 | Cole |
| 2002/0115480 A1 | 8/2002 | Huang |
| 2003/0216069 A1 | 11/2003 | Huang |
| 2004/0189250 A1 | 9/2004 | Nishida |
| 2004/0218411 A1 | 11/2004 | Luu et al. |
| 2004/0259436 A1 | 12/2004 | Su |
| 2005/0007065 A1 | 1/2005 | Freas et al. |
| 2005/0189914 A1 | 9/2005 | Esses |
| 2006/0080476 A1 | 4/2006 | Wang et al. |
| 2006/0202660 A1 | 9/2006 | Chang |
| 2007/0021209 A1 | 1/2007 | Hussaini et al. |
| 2007/0039755 A1 | 2/2007 | Mori et al. |
| 2007/0090788 A1 | 4/2007 | Hansford et al. |
| 2007/0091656 A1 | 4/2007 | Navid et al. |
| 2007/0216352 A1 | 9/2007 | Shaddle |
| 2007/0244471 A1 | 10/2007 | Malackowski |
| 2007/0278999 A1 | 12/2007 | Hsia |
| 2007/0279852 A1 | 12/2007 | Daniel et al. |
| 2008/0015017 A1 | 1/2008 | Ashida et al. |
| 2008/0064500 A1 | 3/2008 | Satsukawa et al. |
| 2008/0164845 A1 | 7/2008 | Choi |
| 2008/0180060 A1 | 7/2008 | Odell et al. |
| 2009/0072782 A1 | 3/2009 | Randall |
| 2009/0072784 A1 | 3/2009 | Erickson |
| 2009/0096413 A1 | 4/2009 | Partovi et al. |
| 2009/0224723 A1 | 9/2009 | Tanabe |
| 2012/0169286 A1 | 7/2012 | Navid |

OTHER PUBLICATIONS

International Search Report, Transmittal and Written Opinion dated Dec. 29, 2008, Application No. PCT/US 08/81004, NYKO Technologies, Inc.

European Search Report for European Application No. 08843118.4 in the name of Nyko Technologies, Inc. European Search Report dated Oct. 22, 2010 and mailed Oct. 29, 2010 (6 pgs).

U.S. Appl. No. 60/749,932, filed Dec. 13, 2005, 6 pages.

Office action for U.S. Appl. No. 13/417,147, filed Mar. 9, 2012 in the name of Amir Navid, Office action mailed Sep. 10, 2012 (28 pgs.).

Office action for U.S. Appl. No. 12/729,526, filed Mar. 23, 2010, inventor Amir Navid, and entitled "Video Game Controller Charging System", Office action mailed Sep. 13, 2012 (12 pgs.).

Office action for U.S. Appl. No. 13/468,994, filed May 10, 2012 in the name of Amir Navid, and entitled "Video Game Controller Charging System Having a Docking Structure", Office action mailed Aug. 22, 2012 (18 pgs.).

Complaint for Patent Infringement, Demand for Jury Trial, *Nyko Technologies, Inc.* vs. *Energizer Holdings, Inc. et. al.*, CV12-03001-GAF(VBKx), Apr. 5, 2012, 41 pages.

Certification and Notice of Interested Parties, *Nyko Technologies, Inc.* vs. *Energizer Holdings, Inc. et. al.*, CV12-03001-GAF(VBKx), Apr. 5, 2012, 1 page.

Corporate Disclosure Statement, *Nyko Technologies, Inc.* vs. *Energizer Holdings, Inc, et. al.*, CV12-03001-GAF(VBKx), Apr. 5, 2012, 1 page.

Notice of Related Cases, *Nyko Technologies, Inc.* vs. *Energizer Holdings, Inc. et. al.*, CV12-03001-GAF(VBKx), Apr. 5, 2012, 1 page.

(56) References Cited

OTHER PUBLICATIONS

Report on the Filing of Determination of an Action Regarding a Patent or Trademark, *Nyko Technologies, Inc.* vs. *Energizer Holdings, Inc. et. al.*, CV12-03001-GAF(VBKx), 1 page.
Notice to Parties of Court-Directed ADR Program, *Nyko Technologies, Inc.* vs. *Energizer Holdings, Inc. et. al.*, CV12-03001-GAF(VBKx), Apr. 5, 2012, 2 pages.
Plaintiffs Ex Parte Application for (1) Temporary Restraining Order and (2) Order to Show Cause Why Preliminary Injunction Should Not issue Memorandum of Points and Authorities in Support thereof, *Nyko Technologies, Inc.* vs. *Energizer Holdings, Inc. et. al.*, CV12-03001-GAF(VBKx), May 10, 2012, 28 pages.
[Proposed] Order Granting Plaintiffs Ex Parte Application for (1) Temporary Restraining Order and (2) Order to Show re Preliminary Injuetion, *Nyko Technologies, Inc.* vs. *Energizer Holdings, Inc. et. al.*, CV12-03001-GAF(VBKx), May 10, 2012, 4 pages.
Notice to Counsel of Ex Parte Application for (1) Temporary Restraining Order and (2) Order to Show Cause why Preliminary Injunction Should not issue, *Nyko Technologies, Inc.* vs. *Energizer Holdings, Inc. et. al.*, CV12-03001-GAF(VBKx), May 10, 2012, 3 pages.
Declaration of Amir Navid in Support of Plaintiff's Ex Parte Application for (1) Temporary Restraining Order and (2) Order to Show Cause re: Preliminary Injunction, *Nyko Technologies Inc.* vs. *Energizer Holdings, Inc. et. al.*, CV12-03001-GAF(VBKx), May 10, 2012, 73 pages.
Declaration of Chris Arbogast in Support of Plaintiff's Ex Parte Application for (1) Temporary Restraining Order and (2) Order to Show Cause re Preliminary Injunction, *Nyko Technologies, Inc.* vs. *Energizer Holdings, Inc. et. al.*, CV12-03001-GAF(VBKx), May 10, 2012, 19 pages.
Declaration of Jason C. Martone in Support of Plaintiff's Ex Parte Application for (1) Temporary Restraining Order and (2) Order to Show Cause re Preliminary Injunction, *Nyko Technologies, Inc.* vs. *Energizer Holdings, Inc. et. al.*, CV12-03001-GAF(VBKx), May 10, 2012,, 6 pages.
Declaration of John D. Carpenter in Support of Plaintiff's Ex Parte Application for (1) Temporary Restraining Order and (2) Order to Show Cause re Preliminary Injunction, *Nyko Technologies, Inc.* vs. *Energizer Holdings, Inc. et. al.*, CV12-03001-GAF(VBKx), May 10, 2012, 5 pages.
Civil Minutes—General, Order re: Temporary Restraining Order, *Nyko Technologies, Inc.* vs. *Energizer Holdings, Inc. et. al.*, CV12-03001-GAF(VBKx), May 11, 2012, 1 page.
Defendant's Opposition to Ex Parte Application for TRO, *Nyko Technologies, Inc.* vs. *Energizer Holdings, Inc. et. al.*, CV12-03001-GAF(VBKx), May 15, 2012, 31 pages.
Declaration of Thomas Roberts in Support of Defendants' Opposition to Application for TRO and Exhibits A-C, *Nyko Technologies, Inc.* vs. *Energizer Holdings, Inc. et. al.*, CV12-03001-GAF(VBKx), May 15, 2012, 17 pages.
Declaration of William Otte in Support of Defendants' Opposition to Application for TRO, *Nyko Technologies, Inc.* vs. *Energizer Holdings, Inc. et. al.*, CV12-03001-GAF(VBKx), May 15, 2012, 3 pages.
Declaration of Steven M. Hanle in Support of Defendants' Opposition to Application for TRO with Exhibits D-V, *Nyko Technologies, Inc.* vs. *Energizer Holdings, Inc. et. al.*, CV12-03001-GAF(VBKx), May 15, 2012, 340 pages.
Defendants' Evidentiary Objections to Declaration of Chris Arbogast (DE 12), *Nyko Technologies Inc.* vs. *Energizer Holdings, Inc. et. al.*, CVI2-03001-GAF(VBKx), May 15, 2012, 11 pages.
Notice of Errata re Defendants' Opposition to Ex Parte Application for TRO and Exhibits W-Y, *Nyko Technologies, Inc.* vs. *Energizer Holdings, Inc. et. al.*, CV12-03001-GAF(VBKx), May 16, 2012, 31 pages.
Reply in Support of Plaintiff's Ex Parte Application for Temporary Restraining Order and Order to Show Cause re Preliminary Injunction, *Nyko Technologies, Inc.*, vs. *Energizer Holdings, Inc. et. al.*, CV12-03001-GAF(VBKx), May 17, 2012, 20 pages.

Supplemental Declaration of Amir Navid in Support of Plaintiff's Ex Parte Application for (1) Temporary Restraining Order and (2) Order to Show Cause re: Preliminary Injunction and Exhibits A-E, *Nyko Technologies, Inc.* vs. *Energizer Holdings, Inc. et. al.*, CV12-03001-GAF(VBKx), May 17, 2012, 15 pages.
Supplemental Declaration of John D. Carpenter in Support of Plaintiff's Ex Parte Application for (1) Temporary Restraining Order and (2) Order to Show Cause re: Preliminary Injunction and Exhibits A-D, *Nyko Technologies, Inc.* vs. *Energizer Holdings, Inc. et. al.*, CV12-03001-GAF(VBKx), May 17, 2012, 17 pages.
Notice of Lodging of Demonstrative Exhibits in Support of Plaintiff's Ex Parte Application for (1) Temporary Restraining Order and (2) Order to Show Cause re: Preliminary Injunction, *Nyko Technoloeies, Inc.* vs. *Energizer Holdings, Inc. et. al.*, CV12-03001-GAF(VBKx), May 17, 2012, 51 pages.
Supplemental Declaration of Jason C. Martone in Support of Plaintiff's Ex Parte Application for (1) Temporary Restraining Order and (2) Order to Show Cause re Preliminary Injunction and Exhibit A, *Nyko Technologies, Inc.* vs. *Energizer Holdings, Inc. et. al.*, CV12-03001-GAF(VBKx), May 17, 2012, 7 pages.
Motion to Strike Plaintiff's Reply in Support of Ex Parte Application for TRO, *Nyko Technologies Inc.* vs. *Energizer Holdings, Inc. et. al.*, CV12-03001-GAF(VBKx), May 17, 2012, 4 pages.
Performance Designed Products LLC's Notice of Interested Parties, *Nyko Technologies, Inc.* vs. *Energizer Holdings, Inc. et. al.*, CV12-03001-GAF(VBKx), May 17, 2012, 3 pages.
Energizer Holdings, Inc.'s Notice of interested Parties, *Nyko Technologies, Inc.* vs. *Energizer Holdings, Inc. et. al.*, CV12-03001-GAF(VBKx), May 17, 2012, 3 pages.
Performance Designed Products LLC's Federal Rule of Civil Procedure 7.1 Disclosure Statement, *Nyko Technologies, Inc.* vs. *Energizer Holdings, Inc. et. al.*, CV12-03001-GAF(VBKx), May 17, 2012, 3 pages.
Energizer Holdings, Inc's Federal Rule of Civil Procedure 7.1 Disclosure Statement, *Nyko Technologies, Inc.* vs. *Energizer Holdings, Inc. et. al.*, CV12-03001-GAF(VBKx), May 17, 2012, 3 pages.
Notice of Errata, *Nyko Technologies, Inc.* vs. *Energizer Holdings, Inc. et. al.*, CV12-03001-GAF(VBKx), May 18, 2012, 6 pages.
Supplemental Declaration of Steven M. Hanle in Support of Defendants' Opposition to Application for TRO, *Nyko Technologies, Inc.* vs. *Energizer Holdings, Inc. et. al.*, CV12-03001-GAF(VBKx), May 29, 2012, 7 pages.
Declaration of Jesse A. Salen in Support of Defendants' Opposition to Application for TRO, *Nyko Technologies, Inc.* vs. *Energizer Holdings, Inc. et. al.*, CVI2-03001-GAF(VBKx), May 29, 2012, 67 pages.
Civil Minutes—General, Motion Hearing (Held and Completed) *Nyko Technologies, Inc.* vs. *Energizer Holdings, Inc. et. al.*, CV12-03001-GAF(VBKx), May 29, 2012, 1 page.
Third Declaration of Amir Navid in Support of Plaintiff's Ex Parte Application for (1) Temporary Restraining Order and (2) Order to Show Cause re: Preliminary Injunction, *Nyko Technologies, Inc.* vs. *Energizer Holdings, Inc. et. al.*, CV12-03001-GAF(VBKx), May 30, 2012, 11 pages.
Plaintiff's Objections to Photographic Exhibits Attached to the Declaration of Jesse A. Salen, *Nyko Technologies, Inc.* vs. *Energizer Holdings, Inc. et. al.*, CV12-03001-GAF(VBKx), May 30, 2012, 6 pages.
First Supplemental Declaration of Chris Arbogast in Support of Plaintiff's Ex Parte Application for (1) Temporary Restraining Order and (2) Order to Show Cause re: Preliminary injunction, *Nyko Technologies. Inc.* vs. *Energizer Holdings, Inc. et. al.*, CV12-03001-GAF(VBKx), May 30, 2012, 3 pages.
Declaration of Russell Herring in Support of Plaintiff's Ex Parte Application for (1) Temporary Restraining Order and (2) Order to Show Cause re: Preliminary Injuction, *Nyko Technologies, Inc.* vs. *Energizer Holdings, Inc. et. al.*, CV12-03001-GAF(VBKx), May 30, 2012, 18 pages.
Supplemental Reply in Support of Plaintiff's Ex Parte Application for Temporary Restraining Order and Order to Show Cause re Preliminary Injuction, *Nyko Technologies, Inc.* vs. *Energizer Holdings, Inc. et. al.*, CV12-03001-GAF(VBKx), May 30, 2012, 6 pages.

(56) References Cited

OTHER PUBLICATIONS

Notice of May 30, 2012 Decision by Court of Appeals for the Federal Circuit in Support of Plaintiff's Ex Parte Application for (1) Temporary Restraining Order and (2) Order to Show Cause re: Preliminary Injunction, *Nyko Technologies, Inc.* vs. *Energizer Holdings, Inc. et. al.*, CV12-03001-GAF(VBKx), May 31, 2012, 22 pages.
Objection to Supplemental Filings by Plaintiff in Support of Temporary Restraining Order, *Nyko Technologies, Inc.* vs. *Energizer Holdings, Inc. et. al.*, CV12-03001-GAF(VBKx), May 31, 2012, 2 pages.
Civil Minutes—General, Order RE: Ex Parte Application for a Temporary Restraining Order, *Nyko Technologies, Inc.* vs. *Energizer Holdings, Inc. et. al.*, CV12-03001-GAF(VBKx), Jun. 1, 2012, 13 pages.
Energizer Holdings, Inc. and Performance Designed Products LLC's Answer to Complaint for Patent Infringement, CV12-03001-GAF(VBKx) Jun. 15, 2012, 27 pages.
Morrison, David; Charging Scheme Lets Portables Climb Out of the Cradle; article; Dec. 9, 2002, Electronic Design.com; 3 pages.
Morrison, David; Charging Scheme Lets Porhibles Climb Out of the Cradle: article; Dec. 9, 2002, Electronic Design.com; 2 pages.
Wallace, Alan; AW Specialties & Resale; article; Alan Wallace Automotive and Specialties, 7 pages.
Casamassina, Matt; Controller Concepts: Charge Cradle—IGN; article; Oct. 4, 2005; IGN.com; 4 pages.
Kauffmann, Stéphane, Cordless Desktop LX 700; review; TomsHardware.com; Oct. 29, 2004; 4 pages.
Kauffmann, Stéphane, Saitek P3000Pad: Annual Review: Six Gamepads; review; TomsHardware.com; Oct. 24, 2003; 4 pages.
Erickson, Craig; Filing Receipt; Oct. 2, 2007; United States Patent and Trademark Office; and U.S. Appl. No. 60/994,263, filed Sep. 17, 2007, 26 pages.
Chartier, David; Charge your iPod, other devices wirelessly with Splashpad; weblog; TUAW.com; Oct. 10, 2005; 3 pages.
Electrical Safety Council: Joytech-Brand Wii Power Station; article; ESC.org; 2012; 2 pages.
Techcast Reviews; Joytech. Wii Power Station; article; Techcastnetworks.com; May 2, 2007; 6 pages.
L 151-10 Charger for BA 151 Batteries; Sennheiser Electronic Corporation; article; 1 page.
Logitech Mx700 Cordless Optical Mouse Setup; journal; Logitech.com; 2002; 24 pages.
Multiple Charger Instructions, Multiple Charger, Model CHG 1600; article; 2005, Williams Sound Corp.; 4 pages.
Chappell, Jennifer; Palm Addicts: The Socket Mobile Power Pack; Journal; PalmAddictypepad.com; Feb. 2006; 3 pages.
PS3 SIXAXIS Charging Station; weblog; Instructables.com; May 22, 2007; 6 pages.
P53 SIXAXIS Charging Station; Instructables share what you make; weblog; Instructables.com; May 22, 2007; 7 pages.
Spector, Devon "Dementor"; Rage3D.com: Thrustmaster Rechargeable Wireless 2-in-1 Dual Trigger Gamepad Review; article; Rage3D.com; 2 pages.
English User Guide, NeoVoice USB, Bluetooth Wireless Headset; Journal; Bluetooth SIG, Inc., U.S.A.; 18 pages.
Thrustmaster Rechargeable Wireless Dual Trigger 2-in-1 User Manual; Journal; 2005; Guillemot Corporation S.A.; 45 pages.
English User Guide 5 Bluetooth Wireless Headset; Journal; Bluetooth SIG, Inc. U.S.A.; 15 pages.
Berardini, César A.; Xbox 360 FAQs—Xbox; article; Teambox.com; Aug. 25, 2005; 6 pages.
*Nyko Technologies, Inc.* vs. *Energizer Holdings, Inc.*, Case No. CV12-03001-GAF-VBK, Performance Designed Products LLC and Energizer Holdings, Inc.'s Initial Invalidity Contentions, 622 pages (3 parts).
*Nyko Technologies, Inc.* vs. *Energizer Holdings, Inc.*, Case No. CV12-03001-GAF-VBK, Defendants First Supplemental Invalidity Contentions, Jan. 24, 2013, 378 pages (4 parts).
Charge Base PS3: Nyko's 4-port charging dock for SIXAXIS Controllers; QJ.net; Jan. 14, 2007; 5 pages.
Nyko Recharge Docks for P53 and Wii Controllers; Technabob.com; Jan. 10, 2007; 16 pages.
Block, Gerry; Nyko Wii Charge Station Review; Rechargeable battery packs and cradle for the battery, devouring Wiimote; IGN.com; Feb. 13, 2007; 6 pages.
Grant, Christopher; Nyko's rechargeable PS3 SIXAXIS and Wiimnote docking stations; Engadget.com, Jan. 9, 2007; 2 pages.
Silwinski, Alexander; Nyko's Wii-chargeable station; Jan. 9, 2007; Joystiq.com; 1 page.
PS3 Friends fear no more!; X-Intelligence Krew; The-xik.blogspot.com; Jan. 15, 2007; 4 pages.
Kohler, Chris; You'll Get a "Charge" Out of These P53 Products!; Wired.com/gamelife; Jan. 9, 2007; 2 pages.
Complaint for Patent Infringement, *Nyko Technologies, Inc.* v. *Energizer Holdings, Inc. et. al.*, CV13-01935, Mar. 18, 2013 (44 pgs.).
Defendants Answer to Complaint for Patent Infringement and Counterclaims (Demand for Jury Trial), *Nyko Technologies, Inc.* v. *Energizer Holdings, Inc. et. al.*, CV13-01935, Apr. 30, 2013 (53 pgs).
Nyko Technologies, Inc.,'s Answer to Defendants' Counterclaim, *Nyko Technologies, Inc.* v. *Energizer Holdings, Inc. et. al.*, CV13-01935, May 24, 2013 (26 pgs.).
Amended Complaint for Patent Infringement, *Nyko Technologies, Inc.* v. *Energizer Holdings, Inc. et. al.*, CV12-03001-GAF(VBKx), Dec. 14, 2012 (47 pgs.).
Joint Claim Construction Statement, *Nyko Technologies, Inc.* v. *Energizer Holdings, Inc. et. al.*, CV12-03001-GAF(VBKx), Dec. 17, 2012 (6 pgs.).
Energizer Holdings, Inc., Eveready Battery Company, Inc., and Performance Designed Products LLC's Answer to Amended Complaint for Patent Infringement and Counterclaim, *Nyko Technologies, Inc.* v. *Energizer Holdings, Inc. et. al.*, CV12-03001-GAF(VBKx), Jan. 2, 2013 (43 pgs.).
Nyko Technologies, Inc.'s Answer to Eveready Battery Company, Inc.'s Counterclaim and PDP's and Energizer Holdings, Inc.'s Improperly Filed Amended Counterclaim, *Nyko Technologies, Inc.* v. *Energizer Holdings, Inc. et. al.*, CV12-03001-GAF(VBKx), Jan. 16, 2013 (14 pgs.).
Plaintiff Nyko Technologies, Inc.'s Opening Claim Construction Brief, *Nyko Technologies, Inc.* v. *Energizer Holdings, Inc. et. al.*, CV12-03001-GAF(VBKx), Apr. 3, 2013 (27 pgs.).
Declaration of Garry Kitchen in Support of Plaintiff Nyko Technologies, Inc.'s Opening Claim Construction Brief, *Nyko Technologies, Inc.* v. *Energizer Holdings, Inc. et. al.*, CV12-03001-GAF(VBKx), Apr. 3, 2013 (37 pgs.).
Defendants' Opening Claim Construction Brief, *Nyko Technologies, Inc.* v. *Energizer Holdings, Inc. et. al.*, CV12-03001-GAF(VBKx), Apr. 8, 2013 (30 pgs.).
Declaration of Graham M. Buccigross in Support of Defendants' Opening Claim Construction Brief, *Nyko Technologies, Inc.* v. *Energizer Holdings, Inc. et. al.*, CV12-03001-GAF(VBKx), Apr. 8, 2013 (113 pgs.).
Declaration of Katherine L. Quigley in Support of Plaintiff Nyko Technologies, Inc.'s Opening Claim Construction Brief, *Nyko Technologies, Inc.* v. *Energizer Holdings, Inc. et. al.*, CV12-03001-GAF(VBKx), Apr. 9, 2013 (268 pgs.).
Defendants' Responsive Claim Construction Brief, *Nyko Technologies, Inc.* v. *Energizer Holdings, Inc. et. al.*, CV12-03001-GAF(VBKx). Apr. 15, 2013 (27 pgs.).
Supplemental Declaration of Graham (Gray) M. Buccigross in Support of Defendants' Responsive Claim Construction Brief, *Nyko Technologies, Inc.* v. *Energizer Holdings, Inc. et. al.*, CV12-03001-GAF(VBKx), Apr. 15, 2013 (98 pgs).
Nyko Technologies, Inc.'s Rebuttal Claim Construction Brief, *Nyko Technologies, Inc.* v. *Energizer Holdings, Inc. et. al.*, CV12-03001-GAF(VBKx), Apr. 15, 2013 (29 pgs.).
Declaration of Katherine L. Quigley in Support of Plaintiff Nyko Technologies, Inc.'s Rebuttal Claim Construction Brief, *Nyko Technologies, Inc.* v. *Energizer Holdings, Inc. et. al.*, CV12-03001-GAF(VBKx), Apr. 15, 2013 (167 pgs.).

(56) References Cited

OTHER PUBLICATIONS

Declaration of Garry Kitchen in Support of Plaintiff Nyko Technologies, Inc.'s Rebuttal Claim Construction Brief, *Nyko Technologies, Inc. v. Energizer Holdings, Inc. et. al.*, CV12-03001-GAF(VBKx), Apr. 15, 2013 (38 pgs.).
Defendants' Notice of Errata Re Responsive Claim Construction Brief, *Nyko Technologies, Inc. v. Energizer Holdings, Inc. et. al.*, CV12-03001-GAF(VBKx) Apr. 16, 2013 (3 pgs.).
Defendants' Corrected Responsive Claim Construction Brief, *Nyko Technologies, Inc. v. Energizer Holdings, Inc. et. al.*, CV12-03001-GAF(VBKx), Apr. 16, 2013 (32 pgs.).
Defendants' Objections to Expert Declarations of Garry Kitchen, *Nyko Technologies, Inc. v. Energizer Holdings, Inc. et. al.*, CV12-03001-GAF(VBKx), Apr. 18, 2013 (21 pgs.).
Declaration of Graham (Gray) M. Buccigross in Support of Defendants' Objections to Expert Declarations of Garry Kitchen, *Nyko Technologies, Inc. v. Energizer Holdings, Inc. et. al.*, CV12-03001-GAF(VBKx), Apr. 18, 2013 (128 pgs.).
Nyko Technologies, Inc.'s Response to Defendants' Objections to Expert Declarations of Garry Kitchen, *Nyko Technologies. Inc. v. Energizer Holdings, Inc. et. al.*, CV12-03001-GAF(VBKx), Apr. 30, 2013 (24 pgs.).
Declaration of Katherine L. Quigley in Support of Nyko Technologies, Inc.'s Response to Defendants' Objections to Expert Declarations of Garry Kitchen, *Nyko Technologies, Inc. v. Energizer Holdings, Inc. et. al.*, CV12-03001-GAF(VBKx), Apr. 30, 2013 (34 pgs.).
Declaration of G. Warren Bleeker in Support of Nyko Technologies, Inc.'s Response to Defendants' Objections to Expert Declarations of Garry Kitchen, *Nyko Technologies, Inc. v. Energizer Holdings, Inc. et. al.*, CV12-03001-GAF(VBKx), Apr. 30, 2013 (35 pgs.).
Notice of Errata, *Nyko Technologies, Inc. v Energizer Holdings, Inc. et. al.*, CV12-03001-GAF(VBKx), May 1, 2013 (2 pgs.).
Declaration of Katherine L. Quigley in Support of Nyko Technologies, Inc.'s Response to Defendants' Objections to Expert Declarations of Garry Kitchen, *Nyko Technologies, Inc. v. Energizer Holdings, Inc. et. al.*, CV12-03001-GAF(VBKx), May 1, 2013 (34 pgs.).
Civil Minutes—General, In Chambers Tentative Claim Construction Ruling, *Nyko Technologies, Inc. v Energizer Holdings, Inc. et. al.*, CV12-03001-GAF(VBKx), May 8, 2013 (2 pgs.).
Civil Minutes—General, Claim Construction Hearing, *Nyko Technologies, Inc. v. Energizer Holdings, Inc. et. al.*, CV12-03001-GAF(VBKx), May 9, 2013 (1 pg.).
SIPO Office Action dated Jun. 27, 2012 with English Translation for related Chinese Patent Application No. 200880122521.7 (7 pgs.).
SIPO Office Action dated Apr. 12, 2013 with English Translation for related Chinese Patent Application No. 200880122521.7 (17 pgs.).
Expert Report of Garry Kitchen on Infringement of U.S. Pat. No. 8,143,848, *Nyko Technologies, Inc. v. Energizer Holdings, Inc. et. al.*, CV12-03001-GAF(VBKx), Aug. 9, 2013 (79 pgs.).
Defendants' Expert Report of Stephen D. Bristow Regarding Invalidity of U.S. Pat. No. 8,143,848, (Confidential Exhibit E Redacted) *Nyko Technologies, Inc. v. Energizer Holdings, Inc. et. al.*, CV12-03001-GAF(VBKx), Aug. 9, 2013 (850 pgs./9 parts).
Civil Minutes—General, In Chambers Order Re: Claim Construction, *Nyko Technologies, Inc. v. Energizer Holdings, Inc. et. al.*, CV12-03001-GAF(VBKx), Jun. 12, 2013 (25 pgs.).
Defendants' Notice of Motion and Motion for Summary Judgment of Patent Invalidity, *Nyko Technologies, Inc, v. Energizer Holdings, Inc. et. al.*, CV12-03001-GAF(VBKx), Aug. 29, 2013 (4 pages).
Memorandum of Points and Authorities in Support of Defendants' Motion for Summary Judgment of Patent Invalidity, *Nyko Technologies, Inc. v. Energizer Holdings, Inc. et. al.*, CV12-03001-GAF(VBKx), Aug. 29, 2013 (27 pgs.).
Statement of Undisputed Facts and Conclusions of Law in Support of Defendants' Motion for Summary Judgment of Patent Invalidity, *Nyko Technologies, Inc. v. Energizer Holdings, Inc. et. al.*, CV12-03001-GAF(VBKx), Aug. 29, 2013 (11 pages).

Declaration of Graham (Gray) Buccigross in Support of Defendants' Motion for Summary Judgment of Patent Invalidity, *Nyko Technologies, Inc. v. Energizer Holdings, Inc. et. al.*, CV12-03001-GAF(VBKx), Aug. 29, 2013 (377 pgs./4 parts).
Declaration of Stephen D. Bristow in Support of Defendants' Motion for Summary Judgment of Invalidity, *Nyko technologies, Inc. v. Energizer Holdings, Inc. et. al.*, CV12-03001-GAF(VBKx), Aug. 29, 2013 (21 pgs.).
Memorandum of Points and Authorities Opposing Defendants' Motion for Summary Judgment of Invalidity, *Nyko Technologies, Inc. v. Energizer Holdings, Inc. et. al.*, CV12-03001-GAF(VBKx), Sep. 3, 2013 (30 pgs.).
Declaration of Garry Kitchen in Opposition to Defendants' Motion for Summary Judgment of Invalidity (Confidential Portion of p. 31 Redacted), *Nyko Technologies, Inc. v. Energizer Holdings, Inc. et. al.*, CV12-03001-GAF(VBKx), Sep. 3, 2013 (63 pgs.).
Declaration of Katherine L. Quigley in Support of Nyko Technologies, Inc.'s Opposition to Defendants' Motion for Summary Judgment, (Confidential Exhibit Q Redacted), *Nyko Technologies, Inc. v. Energizer Holdings, Inc. et. al.*, CV12-03001-GAF(VBKx), Sep. 3, 2013 (214 pgs./2 parts).
Nyko Technologies, Inc.'s Separate Statement of Genuine Disputes of Material Fact, *Nyko Technologies, Inc. v. Energizer Holdings, Inc. et. al.*, CV12-03001-GAF(VBKx), Sep. 3, 2013 (54 pgs.).
Plaintiff Nyko Technologies, Inc.'s Evidentiary Objections to Defendant's Evidence Submitted in Support of Their Motion for Summary Judgment of Patent Invalidity, *Nyko Technologies, Inc. v. Energizer Holdings, Inc. et. al.*, CV12-03001-GAF(VBKx), Sep. 3, 2013 (3 pgs.).
Expert Report of Garry Kitchen on the Validity of U.S. Pat. No. 8,143,848 (Confidential Portion Redacted) *Nyko Technologies, Inc. v. Energizer Holdings, Inc. et. al.*, CV12-03001-GAF(VBKx), Sep. 13, 2013 (482 pgs./3 parts).
Defendants' Responses to Plaintiff's Separate Statement of Genuine Disputes of Material Fact, *Nyko Technologies, Inc. v. Energizer Holdings, Inc. et. al.*, CV12-03001-GAF(VDKx), Sep. 10, 2013 (62 pgs.).
Civil Minutes—General, Motion for Summary Judgment as to Patent Validity filed by Defendants Energizer Holdings Inc, Eveready Battery Company, Inc., Performance Designed Products LLC, *Nyko Technologies, Inc. v. Energizer Holdings, Inc. et. al.*, CV12-03001-GAF(VBKx), Sep. 23, 2013 (1 pg.).
Notice of Supplemental Authority Re Defendants' Motion for Summary Judgment of Patent Invalidity, *Nyko Technologies, Inc. v. Energizer Holdings, Inc. et. al.*, CV12-03001-GAF(VBKx), Sep. 27, 2013 (13 pgs.).
Civil Minutes—General, Order Re: Defendants' Motion for Summary Judgment, *Nyko Technologies, Inc. v. Energizer Holdings, Inc. et. al.*, CV12-03001-GAF(VBKx), Oct. 22, 2013 (23 pgs.).
Judgment Pursuant to Fed. R. Civ. Proc. 54(b), *Nyko Technologies, Inc. v. Energizer Holdings, Inc. et. al.*, CV12-03001-GAF(VBKx), Nov. 4, 2013 (2 pgs.).
Report on the Filing or Determination of an Action Regarding Patent or Trademark, *Nyko Technologies, Inc. v. Energizer Holdings, Inc. et. al.*, CV12-03001-GAF(VBKx), Nov. 4, 2013 (3 pgs.).
Notice of Appeal, *Nyko Technologies, Inc. v. Energizer Holdings, Inc. et. al.*, CV12-03001-GAF(VBKx), Nov. 8, 2013 (5 pgs.).
Reply Memorandum in Support of Defendants' Motion for Summary Judgment of Patent Invalidity, *Nyko Technologies, Inc. v. Energizer Holdings, Inc. et. al.*, CV12-03001-GAF(VBKx), Sep. 10, 2013 (25 pgs.).
Non-Confidential Brief of Appellant, *Nyko Technologies, Inc. v. Energizer Holdings, Inc. et. al.*, Appeal No, 14-1085, Feb. 12, 2014 (63 pgs.).
Brief of Defendants—Appellees Energizer Holdings, Inc., Eveready Battery Company, Inc., and Performance Designed Products LLC, *Nyko Technologies, Inc. v. Energizer Holdings, Inc. et. al.*, Appeal No. 14-1085, Apr. 28, 2014 (50 pgs.).
Reply Brief of Appellant, *Nyko Technologies, Inc. v. Energizer Holdings, Inc. et. al.*, Appeal No. 14-1085, Jun. 16, 2014 (45 pgs.).
Citation of Supplemental Authority, *Nyko Technologies, Inc. v. Energizer Holdings, Inc. et. al.*, Appeal No. 14-1085, Jan. 5, 2015 (9 pgs.).

(56) References Cited

OTHER PUBLICATIONS

Judgment, *Nyko Technologies, Inc.* v. *Energizer Holdings, Inc. et. al.*, Appeal No. 14-1085, Jan. 12, 2015 (2 pgs.).

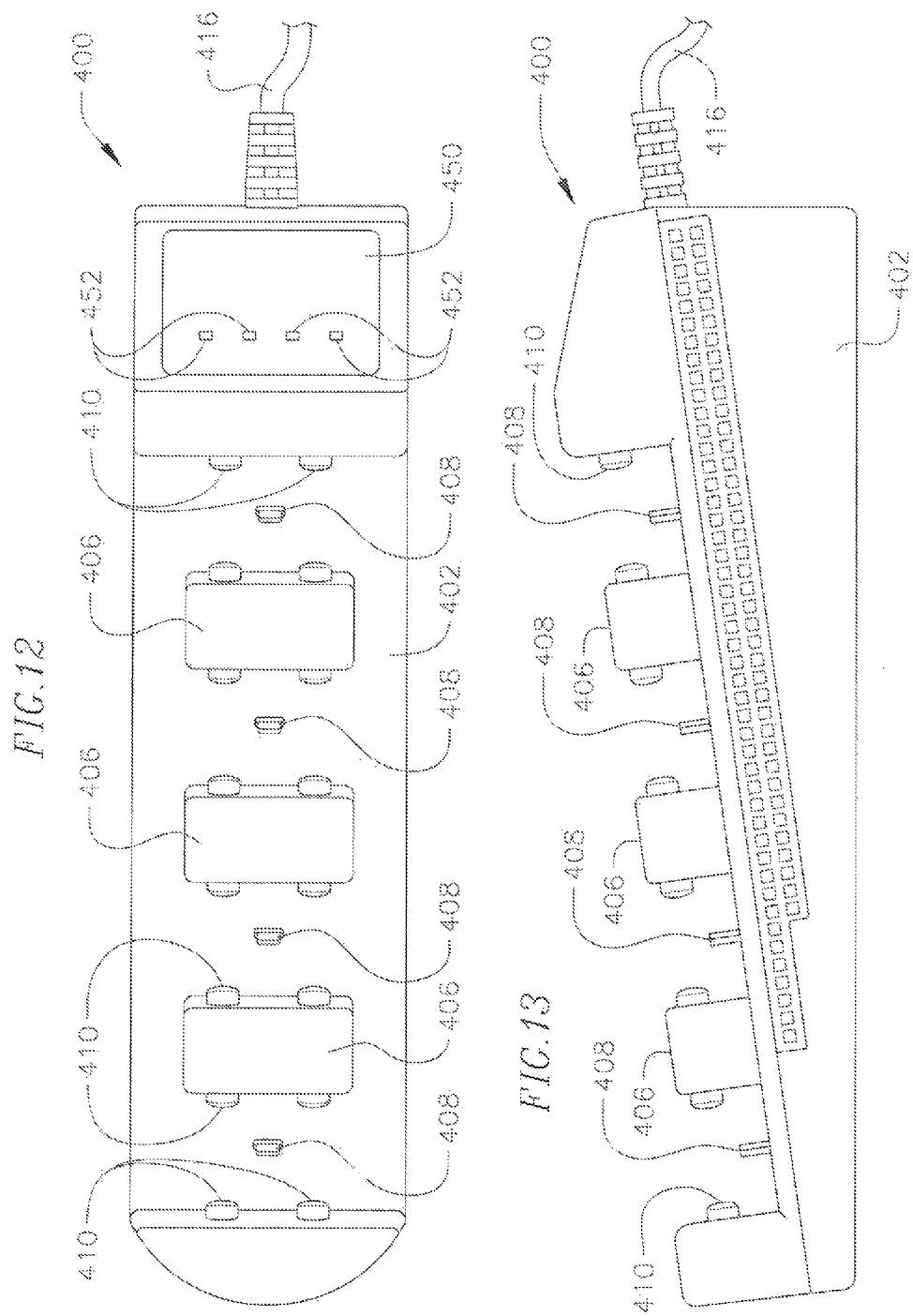

VIDEO GAME CONTROLLER CHARGING SYSTEM HAVING A DOCKING STRUCTURE

CROSS-REFERENCE TO RELATED APPLICATION(S)

This application is a continuation of U.S. application Ser. No. 14/158,703, filed on Jan. 17, 2014, issued Nov. 3, 2015 as U.S. Pat. Ser. No. 9,174,121, which is a continuation of U.S. application Ser. No. 13/769,709, filed Feb. 18, 2013, issued Jan. 21, 2014 as U.S. Pat. No. 8,633,675, which is a continuation of U.S. application Ser. No. 13/417,147, filed Mar. 9, 2012, issued Sep. 17, 2013 as U.S. Pat. No. 8,536,832, which is a continuation of U.S. application Ser. No. 12/044,295, filed Mar. 7, 2008, issued Mar. 27, 2012 as U.S. Pat. No. 8,143,848, which is a continuation-in-part of U.S. application Ser. No. 11/581,137, filed on Oct. 13, 2006, now abandoned, the entire contents of which are expressly incorporated herein by reference.

Application Ser. No. 12/044,295 also claims the benefit of U.S. Provisional Application No. 60/982,364, filed Oct. 24, 2007, the entire content of which is also incorporated herein by reference.

FIELD OF THE INVENTION

The present invention relates to charging systems for consumer electronics devices, and more particularly to charging systems for hand-held video game controllers.

BACKGROUND

Hand-held and portable electronic devices have become increasingly widespread and are used daily by many consumers. Examples of such devices include cellular phones, pagers, CD and MP3 players, digital organizers, video game units, digital cameras, and many other electronic devices. Most of these hand-held and portable devices rely on battery power while operating and require periodic recharging at an alternating current (AC) outlet. Each device requires its own power adapter, one end of which fits into the AC outlet and the other end into the device. Thus, in order to recharge multiple devices, consumers have to carry, keep track of, and operate multiple power adapters.

Consumer electronics devices ("CED"), such as personal computers, video game consoles, cell phones, and other devices, often utilize accessory devices that operate in connection with the CED. Examples of accessory devices include wireless headsets, audio speakers, and handheld controllers. These accessory devices often operate on battery power, so that they can be used without requiring a connection to a power supply. Frequent use of these battery-powered accessory devices drains the batteries and requires frequent replacement or recharging of the batteries. Frequent replacement of batteries can be expensive, and as a result, many accessory devices utilize rechargeable batteries.

Of the accessory devices, wireless handheld controllers (or video game controllers) are often used by video game players together with the corresponding video game console. Many video games allow multiple players to play concurrently, thereby requiring multiple handheld controllers.

The accessory device is connected to a charging station periodically to recharge the batteries. The charging station and the accessory device have matching plugs or ports that fit together to make a connection. If the plug on the charging station or the accessory device is broken or damaged, the accessory device can no longer be connected to the charging station. These plugs can be small and/or fragile, as the accessory device itself is often a small, compact device. These small plugs can be easily bent or broken, rendering the charging station inoperable. The user has to be careful to connect the plugs slowly, gently, and completely, on order to make a proper connection without damaging the parts.

SUMMARY OF THE INVENTION

In one exemplary embodiment, a video game controller charging system for charging at least one video game controller using externally supplied power includes: a base; at least one structure on the base for providing physical support to the at least one video game controller while the at least one video game controller is being charged; and at least one DC port on the base configured to couple to and provide DC power to a power input port of the at least one video game controller.

In one embodiment, the at least one DC port includes at least one male mini-USB connector.

In one embodiment, the video game controller charging system further includes a current detector electrically coupled to the at least one DC port and an indicator electrically coupled to the current detector. The indicator is configured to indicate a charging status of the video game controller charging system and may include at least one LED.

In one embodiment, the at least one structure on the base includes at least one docking bay configured to receive one of the video game controllers.

In one embodiment, the at least one structure on the base includes opposite surfaces configured to align one of the at least one video game controller such that the power input port of the video game controller couples to one of the at least one DC port. Also, the opposite surfaces may include spring-loaded locating buttons configured to align the video game controller.

In one embodiment, the at least one DC port comprises a plurality of DC ports, the at least one video game controller comprises a plurality of video game controllers, and the plurality of DC ports is configured to concurrently couple to and provide the DC power to the plurality of video game controllers.

In one embodiment, the video game controller charging system further includes an AC-to-DC converter adapted to convert the externally supplied power to the DC power provided to the power input port of the at least one video game controller. In one embodiment, the AC-to-DC converter is in the base. In another embodiment, the AC-to-DC converter is external to the base.

In one embodiment, the AC-to-DC converter is adapted to convert an AC voltage in the range of 100 V to 240 V corresponding to the externally supplied power into a DC voltage corresponding to the DC power. The DC voltage may be DC 5 V.

In another exemplary embodiment, a charging system for at least one accessory device having a power input port includes: a base; at least one male mini-USB connector supported by the base and adapted to provide DC power to the at least one accessory device; at least one docking structure configured to receive and align the at least one accessory device to couple to the at least one male mini-USB connector; and a power input for connecting to a power supply, the power input electrically coupled to the at least one male mini-USB connector.

In one embodiment, the charging system further includes an AC-to-DC converter electrically coupled between the power input and the at least one male mini-USB connector.

In one embodiment, the charging system further includes an AC-to-DC converter external to the base and electrically coupled to the power input.

In one embodiment, the charging system further includes a current detector electrically coupled to the at least one male mini-USB connector and an indicator electrically coupled to the current detector, the indicator configured to indicate a charging status of the charging system. The indicator may include at least one LED.

In still another exemplary embodiment, a video game controller charging system for at least one video game controller having a power input port includes: a base; at least one male mini-USB connector supported by the base and adapted to provide DC power to the power input port of the at least one video game controller, and at least one docking structure having opposite surfaces configured to receive and align the at least one video game controller to couple the power input port of the at least one video game controller to the at least one male mini-USB connector.

In one embodiment, the video game controller charging system further includes an AC-to-DC converter adapted to convert an AC power received from an AC power supply to the DC power provided to the power input port of the at least one video game controller.

In another exemplary embodiment of the invention, a charging system for charging at least one accessory device having a power input port includes a base with at least one recess having at least one electrical contact. The base further includes a power input for connection to a power supply, the power input being electrically coupled to the at least one electrical contact. The charging system also includes at least one external adapter including a connector configured to couple to the power input port of one of the accessory devices, the at least one external adapter also including at least one electrical lead. The at least one recess is dimensioned to receive the at least one external adapter, the at least one electrical lead contacting the at least one electrical contact when the external adapter is received by the recess.

Another embodiment of the present invention provides a power adapter capable of supplying power from an AC outlet to a variety of hand-held devices. In exemplary embodiments of the present invention, a power adapter for recharging electronic devices is provided. The power adapter may have a Universal Serial Bus (USB) port to which a device with a USB plug can be connected for recharging. The adapter may also have a FireWire port to which a device with a FireWire plug can be connected for recharging. FireWire is a proprietary name of Apple Computer for the IEEE 1394 interface. Both ports may be operated concurrently to recharge a USB device and a FireWire device at the same time. The adapter also has an alternating current (AC) plug which is fixed or movable such that the plug extends from the rear side of the adapter. The AC plug can be fixed to the adapter body, or be slid or moved somehow into the adapter when the adapter is not in use for easy storage. When the adapter is in use, the AC plug is plugged into an AC outlet. The adapter draws power from the outlet and supplies that power to the USB and FireWire devices to enable them to recharge.

According to the present invention, in one embodiment a power adapter is provided that includes a housing body having a first side and a plurality of second sides. A plug is located on the first side and is adapted to connect to an AC outlet for providing an AC power. A first DC port is located on one of the second sides and is adapted to provide a first DC power to a first external device. A second DC port is located on one of the second sides and is adapted to provide a second DC power to a second external device. An AC-to-DC converter is located in the housing body and is adapted to convert an AC power received through the plug to the first DC power and the second DC power.

In one embodiment, the first DC port and the second DC port are USB ports. In another embodiment, the first DC port and the second DC port are FireWire ports. In yet another embodiment, the first DC port is a USB port and the second DC port is a FireWire port.

In one embodiment, the first DC power and the second DC power have different voltages. In another embodiment, the first DC power supplies DC 5 V and the second DC power supplies DC 13 V.

In one embodiment, the power adapter also includes a plurality of DC ports, each DC port being located on one of the second sides and being adapted to provide a DC power to an external device, wherein each DC port is selected from the group consisting of USB port, FireWire port, PS/2 port, serial port, and parallel port.

In one embodiment, the AC-to-DC converter is adapted to convert an AC voltage of 120 V or 240 V corresponding to the AC power to DC voltages corresponding to the first DC power and the second DC power.

In one embodiment, the AC-to-DC converter is adapted to convert an AC voltage in the range of 100 V to 240 V corresponding to the AC power to DC voltages corresponding to the first DC power and the second DC power.

In another exemplary embodiment, a power adapter is provided that includes a housing body having a first side and a plurality of second sides. A plug is located on the first side and is adapted to connect to an AC outlet for providing an AC power. The power adapter includes a plurality of USB ports, whereas each USB port is located on one of the second sides and is adapted to provide a DC power to an external device. An AC-to-DC converter is located in the housing body and is adapted to convert an AC power received through the plug to the DC power.

In one embodiment, the power adapter also includes at least one DC port, each DC port being located on one of the second sides and adapted to provide a second DC power to an external device, wherein each DC port is selected from the group consisting of FireWire port, PS/2 port, serial port, and parallel port.

In one embodiment, the AC-to-DC converter is adapted to convert an AC voltage of 120 V or 240 V corresponding to the AC power to a DC voltage corresponding to the DC power.

In one embodiment, the AC-to-DC converter is adapted to convert an AC voltage in the range of 100 V to 240 V corresponding to the AC power to a DC voltage corresponding to the DC power.

In another exemplary embodiment, a power adapter is provided that includes a housing body having a first side and a plurality of second sides. A plug is located on the first side and is adapted to connect to an AC outlet for providing an AC power. The power adapter includes a plurality of FireWire ports, whereas each FireWire port is located on one of the second sides and is adapted to provide a DC power to an external device. An AC-to-DC converter is located in the housing body and is adapted to convert an AC power received through the plug to the DC power.

In one embodiment, the plug is fixed to the housing body. In another embodiment, the plug is movable between a first position for plugging into the AC outlet and a second position inside the housing body.

In another exemplary embodiment of the present invention, a power adapter having a plurality of USB ports of various sizes to accommodate devices with different types of USB plugs (e.g., USB plugs of type A or type B) is provided. The adapter also has a plurality of FireWire ports of various sizes to accommodate devices with different types of FireWire plugs (e.g., 4-pin or 6-pin FireWire plugs).

In yet another exemplary embodiment of the present invention, a power adapter having a plurality of ports of various types to accommodate many different electronic devices, is provided.

BRIEF DESCRIPTION OF THE DRAWINGS

FIG. 12 is a top view of the video game controller charging system of FIG. 11.

FIG. 13 is a side view of the video game controller charging system of FIG. 11.

DETAILED DESCRIPTION

Figure 1:
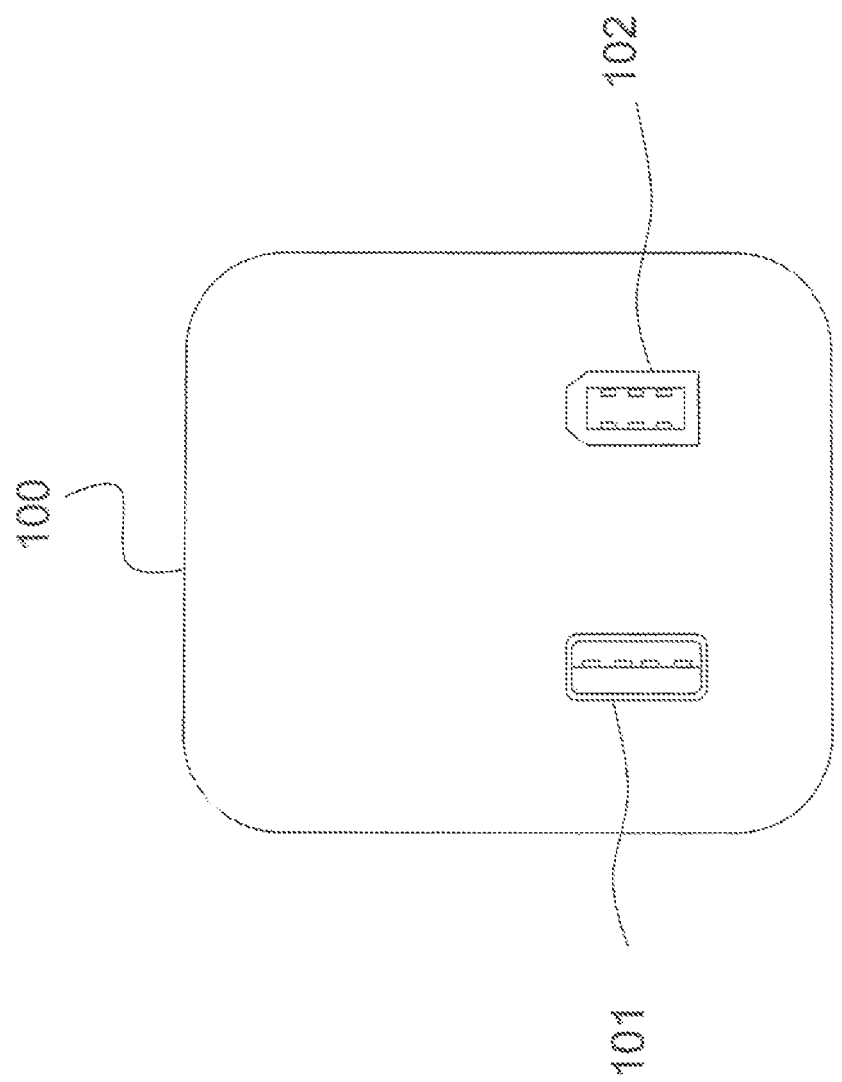
FIG. 1 is a schematic front view diagram of a power adapter in an exemplary embodiment of the present invention.

In one embodiment, a video game controller charging system is provided. The video game controller charging system includes a base, at least one structure on the base for providing physical support to at least one video game controller while it is being charged, and at least one DC port on the base configured to couple to and provide DC power to a power input port of the at least one video game controller. In some embodiments, the video game controller charging system may include a current detector, a charging status indicator, at least one docking bay, and/or an AC-to-DC converter adapted to convert externally supplied power to the DC power provided to the power input port of at least one video game controller. In other embodiments, the base of a charging system (or "charging station") may include a recess having at least one electrical contact and a power input for connection to a power supply, the power input being electrically coupled to the at least one electrical contact. The charging station also includes an external adapter with a connector configured to couple to a power input port of the accessory device, and with at least one electrical lead. The recess is dimensioned to receive the adapter, with the at least one electrical lead contacting the at least one electrical contact when the adapter is received by the recess.

In another embodiment, a power adapter includes a housing body having a plurality of sides. In addition, the power adapter includes a plug located on one side of the housing body and adapted to connect to an alternating current (AC) outlet. Furthermore, the power adapter includes first and second direct current (DC) ports, each located on a side of the housing body and each adapted to provide a DC power to an external device. Finally, the power adapter includes an AC-to-DC converter for converting the AC power received through the plug to the DC powers supplied to external devices.

A power adapter may include one or more USB ports to which devices with USB plugs can be connected for recharging. The adapter may also include one or more FireWire ports to which devices with FireWire plugs can be connected for recharging. Both ports may be operated concurrently. The adapter also has an AC plug that is fixed or is movable between a first position (e.g., operating position) and a second position (e.g., non-operating position). By way of example, the AC plug may extend from the rear side of the adapter. The AC plug can be fixed to the adapter housing body, or it can be retracted, folded, slid, or somehow moved into the adapter housing body for easy storage when the adapter is not in use. When the adapter is in use, the AC plug is plugged into an AC outlet. In one embodiment, the adapter draws AC power from the outlet, converts it to DC powers having +5 V and +13 V, respectively, and supplies the DC powers to the USB and FireWire devices, respectively, to enable them to recharge.

In each of the disclosed embodiments, the USB, FireWire, serial, parallel, and generally DC ports, may be either male or female. That is, the DC charging ports may be female and accept a plug, or may itself be a port plug for plugging into a port in an external device.

FIG. 1 is a schematic front view diagram of a power adapter 100 in an exemplary embodiment of the present invention. The power adapter 100 has a USB port 101 to which a device with a USB plug can be connected for recharging. The power adapter 100 also has a FireWire port 102 to which a device with a FireWire plug can be connected for recharging. The power adapter 100 includes an AC-to-DC power converter for providing +5 V and +13 V, respectively. The power adapter 100 may take an input of 100 V to 240 V (w/ frequencies of 50 Hz or 60 Hz) AC power and/or any other standard AC outlet voltage to enable the power adapter 100 to be used in a number of different countries throughout the world.

In the United States, AC voltage is standardized at 120 V, but in practice voltages range from 105 V to 130 V. In other parts of the world, voltages range from 100 V to 240 V. The frequencies vary across the world as well. In the U.S., 60 Hz is the standard. However, in other parts of the world, AC voltage is supplied at 50 Hz or 60 Hz. The AC-to-DC power converters in the power adapter may be adapted to convert AC voltages from a particular standard to a DC voltage required of the DC ports in the power adapter.

The USB port 101 is capable of delivering DC power having +5 V to a connected USB device. The FireWire port 101 is capable of delivering DC power having +13 V to a connected FireWire device. Ports 101, 102 may be operated concurrently to recharge a USB device and a FireWire device at the same time. While FIG. 1 illustrates that ports 101, 102 are located at the front surface of the power adapter 100, the ports may be located at any suitable location on the front, rear, side, top, or bottom surfaces or sides of the adapter 100.

Figure 2:
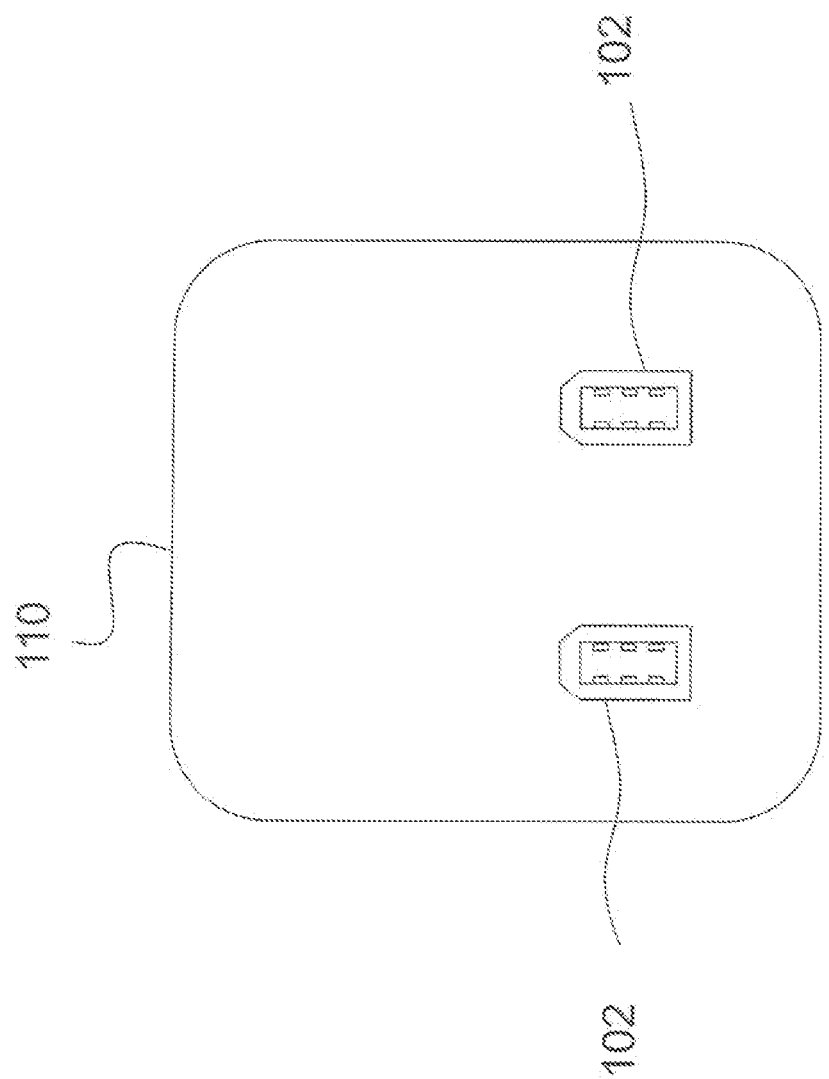
FIG. 2 is a schematic front view diagram of a power adapter in another exemplary embodiment of the present invention.

FIG. 2 is a schematic front view diagram of a power adapter 110 in another exemplary embodiment of the present invention. The power adapter 110 has two FireWire ports 102 to which a device with a FireWire plug can be connected for recharging. The FireWire ports 102 may be of a different type and may accept 4-pin or 6-pin FireWire connections. Each FireWire port 102 is capable of delivering DC power having +13 V to a connected FireWire device. Ports 102 may be operated concurrently to recharge FireWire devices at the same time.

Figure 3:
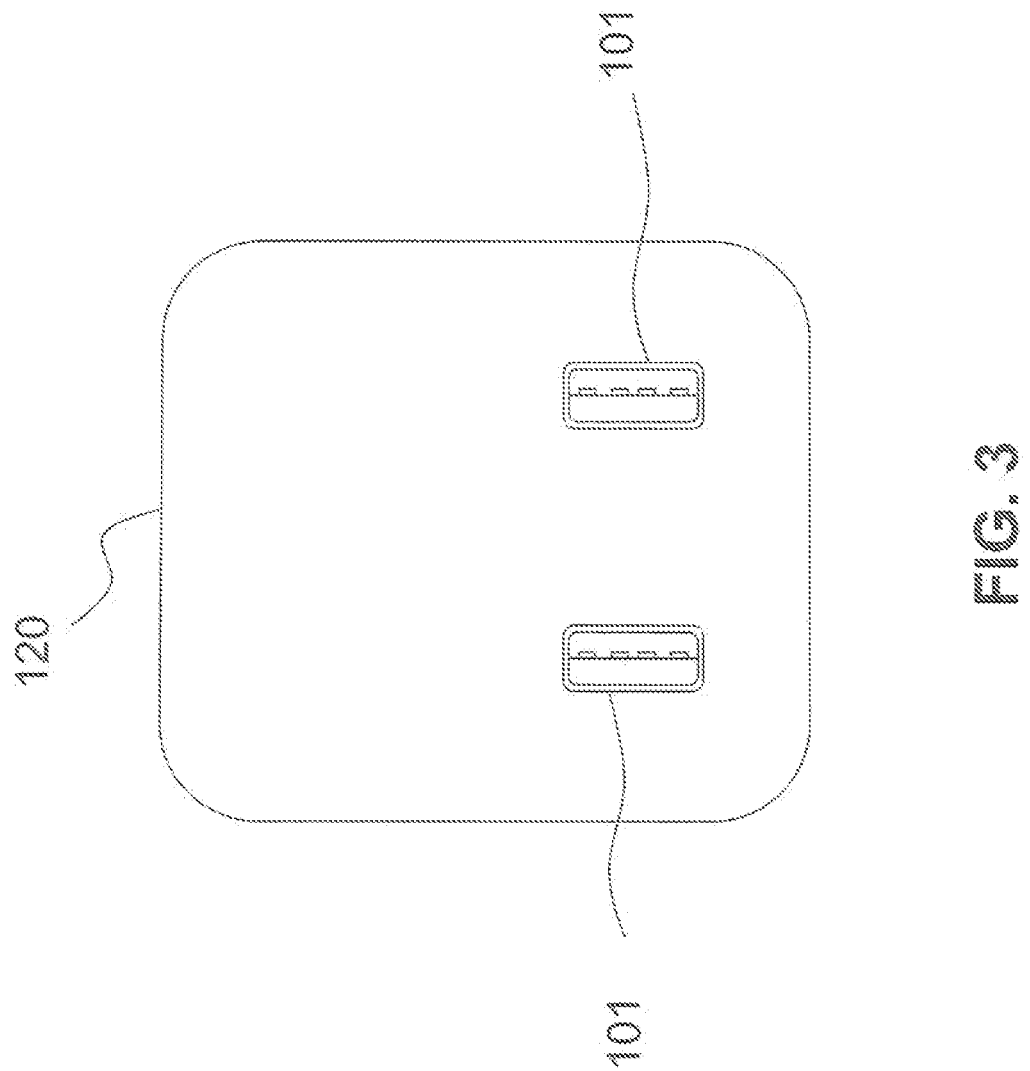
FIG. 3 is a schematic front view diagram of a power adapter in yet another exemplary embodiment of the present invention.

FIG. 3 is a schematic front view diagram of a power adapter 120 in yet another exemplary embodiment of the present invention. The power adapter 120 has two USB ports 101 to which a device with a USB plug can be connected for recharging. The USB ports 101 may be of a different type and may accept type A or type B connections. Each USB port 101 is capable of delivering DC power having +5 V to a connected USB device. Ports 101 may be operated concurrently to recharge USB devices at the same time.

Figure 4:
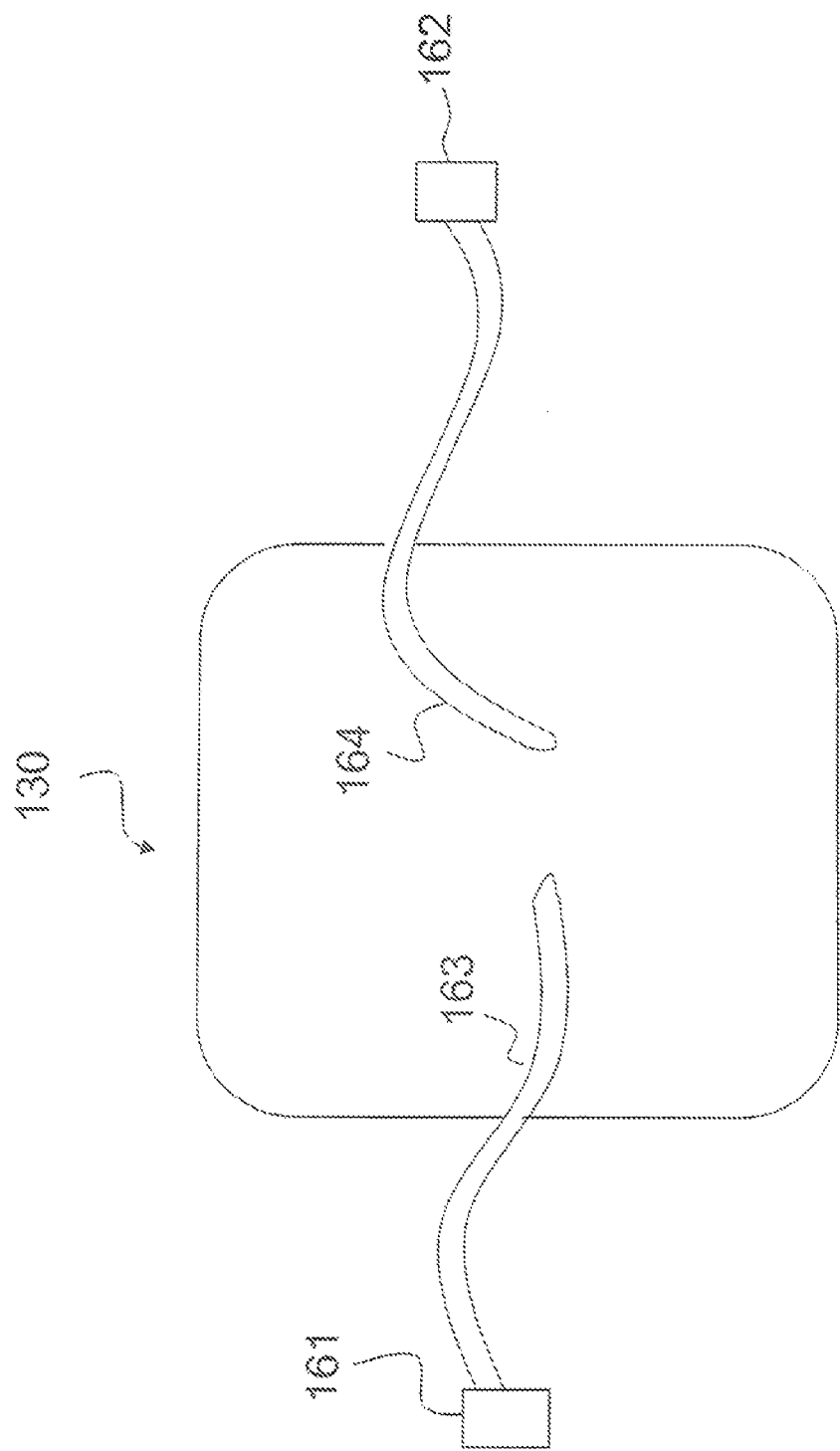
FIG. 4 is a schematic front view diagram of a power adapter in another exemplary embodiment of the present invention.

FIG. 4 is a schematic front view diagram of a power adapter 130 in another exemplary embodiment of the present invention. Power adapter 130 has a USB port 161 and a FireWire port 162 that are connected to lines 163. The lines extend the ports so that USB and FireWire plugs may be inserted into the extended ports without having to reach the power adapter 130 plugged into an AC outlet. Although a USB and FireWire port are shown in FIG. 4, this embodiment includes all possible combinations of ports, the combination being formed from USB, FireWire, serial, parallel ports, and other DC charging ports, in various combinations.

Figure 5:
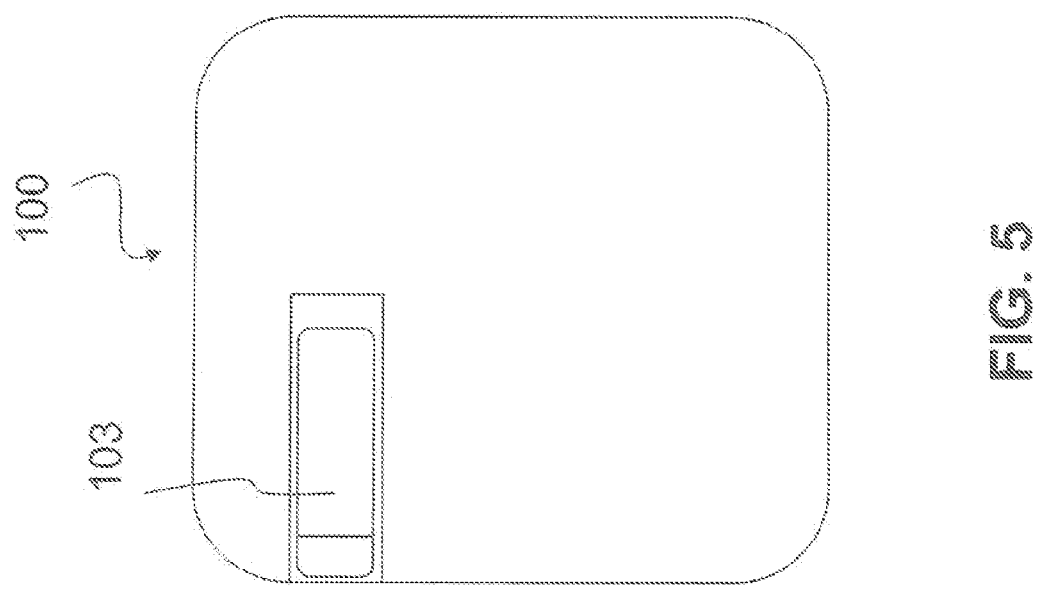
FIG. 5 is a schematic side view diagram of the power adapter of FIG. 1 in a non-operating position.

FIG. 5 is a schematic side view diagram of the power adapter 100 of FIG. 1 in its non-operating position. The power adapters 110 and 120 of FIGS. 2 and 3 have substantially the same structure in one embodiment. As shown in FIG. 5, the power adapter 100 may have an AC plug 103 that is movable such that it extends from the rear side of the adapter 100. In the non-operating position, when the adapter 100 is not in use, the AC plug 103 is slid, moved, or otherwise positioned into the adapter 100 so that the plug 103 does not extend out from the adapter 100. This non-operating position allows for easy storage of the adapter 100. In other embodiments, the plug may be fixed to the adapter housing body and is not movable.

Figure 6:
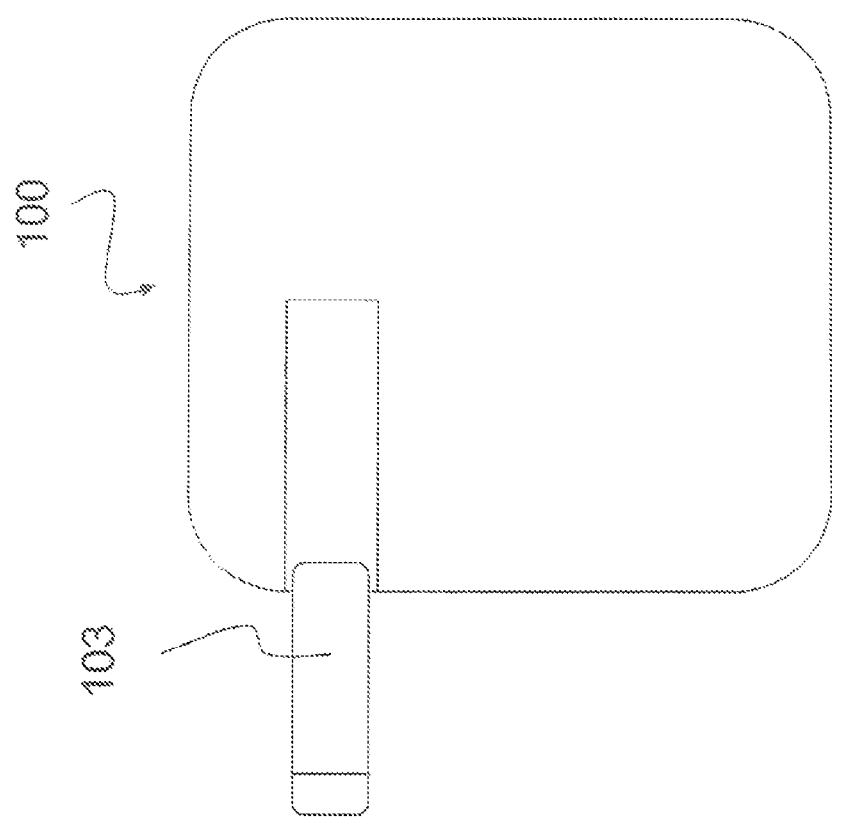
FIG. 6 is a schematic side view diagram of the power adapter of FIG. 1 in an operating position.

FIG. 6 is a schematic side view diagram of the power adapter 100 of FIG. 1 in its operating position. As shown in FIG. 6, when the power adapter 100 is in use, the AC plug 103 is slid, moved, or otherwise positioned outside of the housing of the adapter 100, so that the plug 103 extends out from the adapter 100 in its operating position. In this position the AC plug 103 may be plugged into an AC outlet so that the adapter 100 can draw AC power from the outlet, convert it to DC powers having +5V and +13V, respectively, and supply the DC powers to hand-held and portable electronic devices.

While the AC plug 103 of the power adapter 100 illustrated in FIGS. 5 and 6 appears as a pair of parallel flat bars that are commonly used in the United States and some other countries, for international use, the AC plug may have a shape of a pair of cylindrical bars used in many Asian and European countries, and/or any other suitable shape. Furthermore, a single power adapter may include a number of different types of AC plugs for use in many different countries having different AC plug types/AC power voltages.

Figure 7:
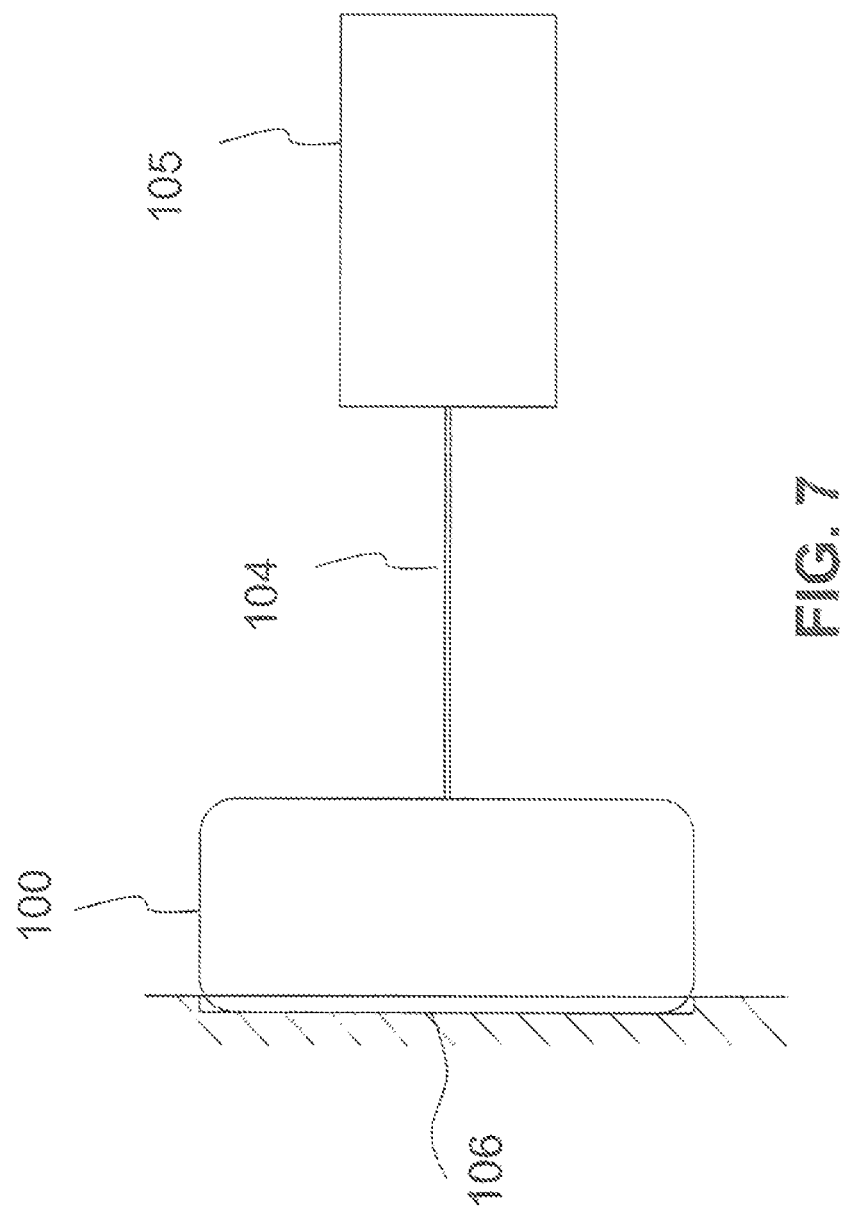
FIG. 7 is a conceptual diagram of a side view of the adapter and the electronic device in an exemplary embodiment of the present invention.

FIG. 7 is a conceptual diagram of a side view of an adapter 100 and an electronic device 105 in an exemplary embodiment of the present invention. The adapter 100 is plugged into an AC outlet 106. A device 105 is connected to the adapter 100 by a cable 104. The cable 104 plugs into the adapter 100 through a plug 101 or 102, shown in FIG. 1. The adapter 100 draws power from the AC outlet 106 and delivers the power to the device 105 through the cable 104.

Figure 8:
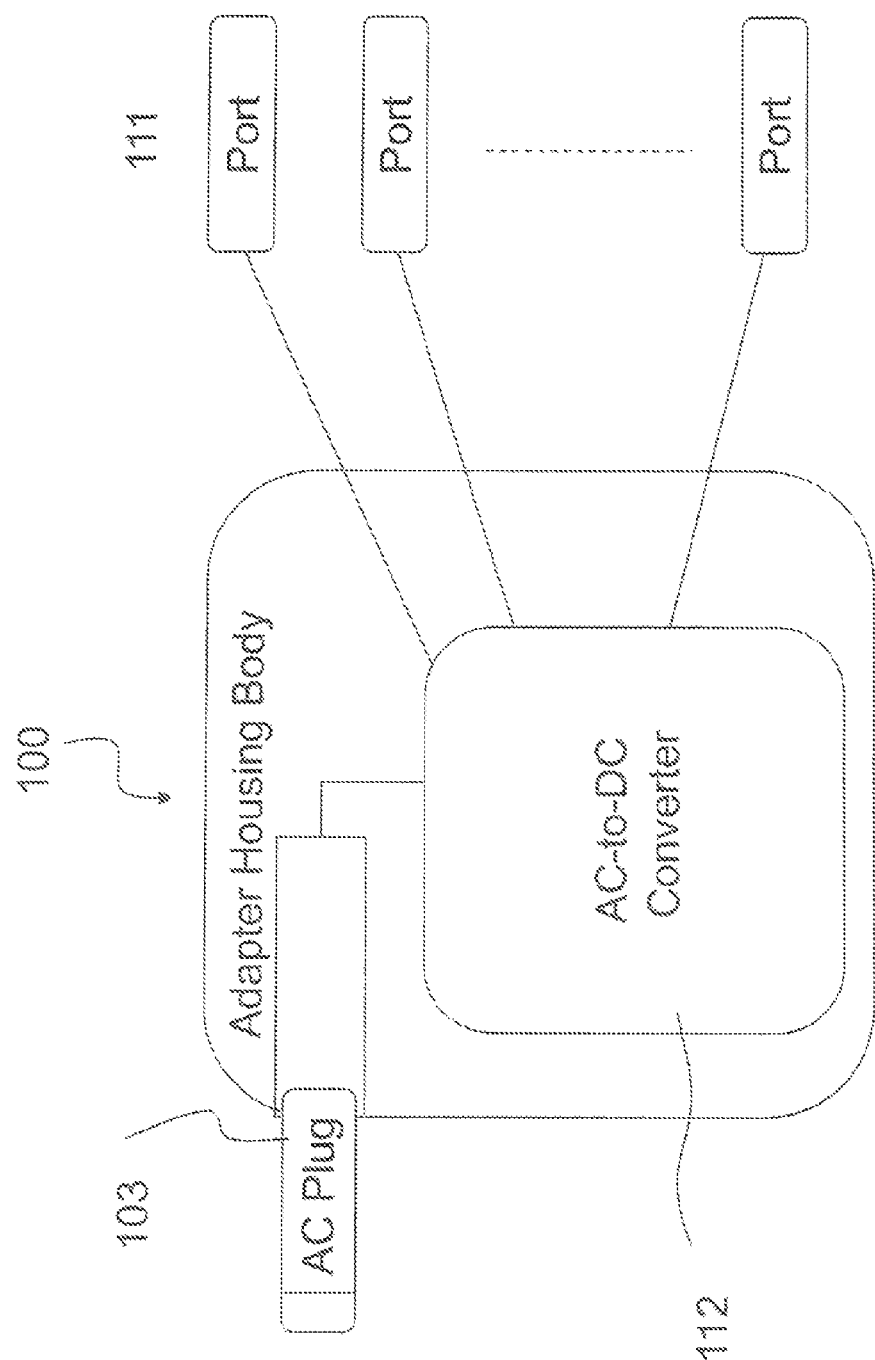
FIG. 8 is a diagram showing the AC-to-DC converter in the adapter.

FIG. 8 is a diagram showing the AC-to-DC converter in the adapter 100. The AC-to-DC converter 112 is located in the housing body of the adapter 100. The AC-to-DC converter 112 receives an AC power from the AC plug 103 via an AC outlet 106 and provides DC power to a plurality of DC ports 111. The AC-to-DC converter 112 may be composed of multiple AC-to-DC converters in order to provide different DC power voltages to the DC ports 111. For example, in FIG. 1, the AC-to-DC converter would receive AC power from the AC plug 103 and provide DC 5 V to one DC port (e.g., USB port 101) and DC 13 V to another DC port (e.g., FireWire port 102).

Figure 9:
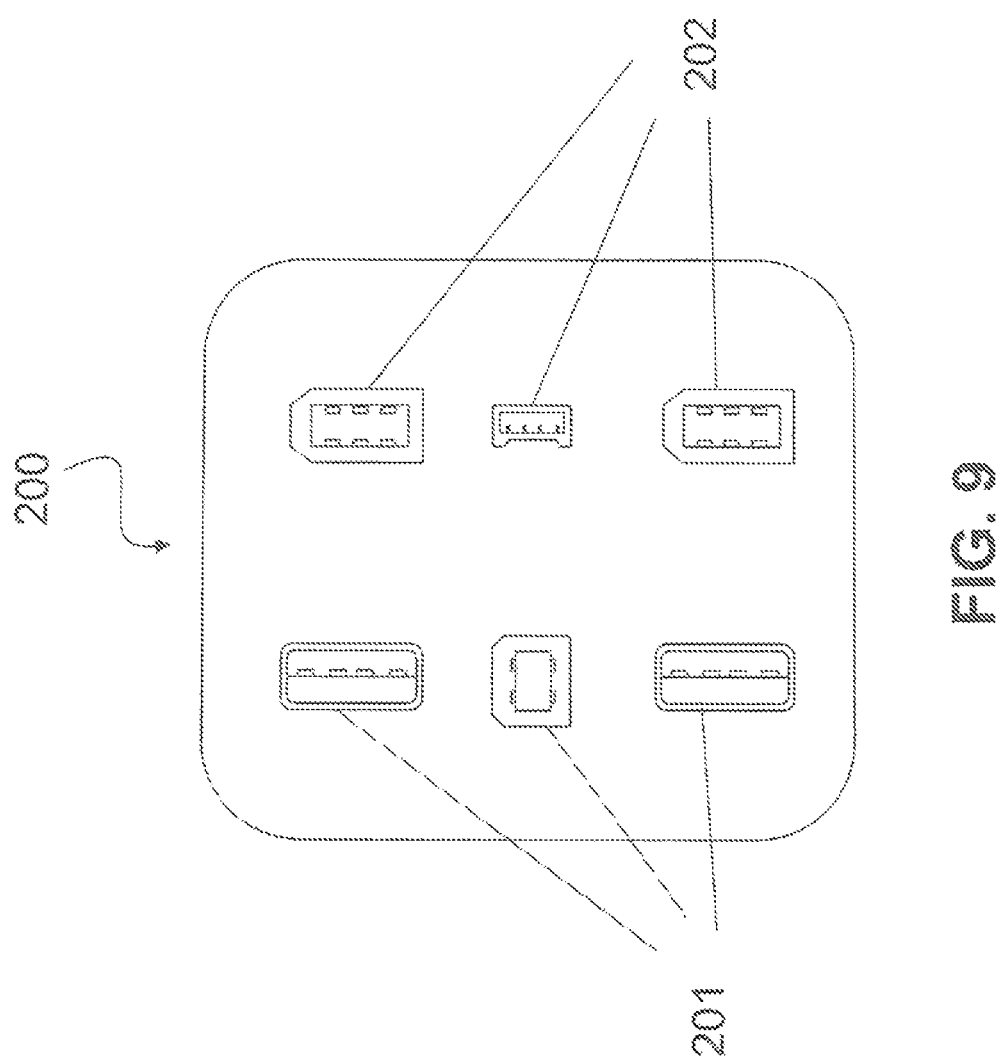
FIG. 9 is a schematic front view diagram of a power adapter in another exemplary embodiment of the present invention.

FIG. 9 is a schematic front view diagram of a power adapter 200 in another exemplary embodiment of the present invention. The adapter 200 has a plurality of USB ports 201 to which a plurality of devices with USB plugs can be connected for recharging. The USB ports 201 may be of various sizes to accommodate devices having different types of USB plugs (e.g., USB plugs of type A or type B). The adapter 200 also has a plurality of FireWire ports 202 to which a plurality of devices with FireWire plugs can be connected for recharging. The FireWire ports 202 may likewise be of various sizes to accommodate devices having different types of FireWire plugs (e.g., 6-pin or 4-pin FireWire plugs). The ports 201 and 202 may be located at any suitable location on the front, rear, side, top, or bottom surfaces or sides of the adapter 200.

Figure 10:
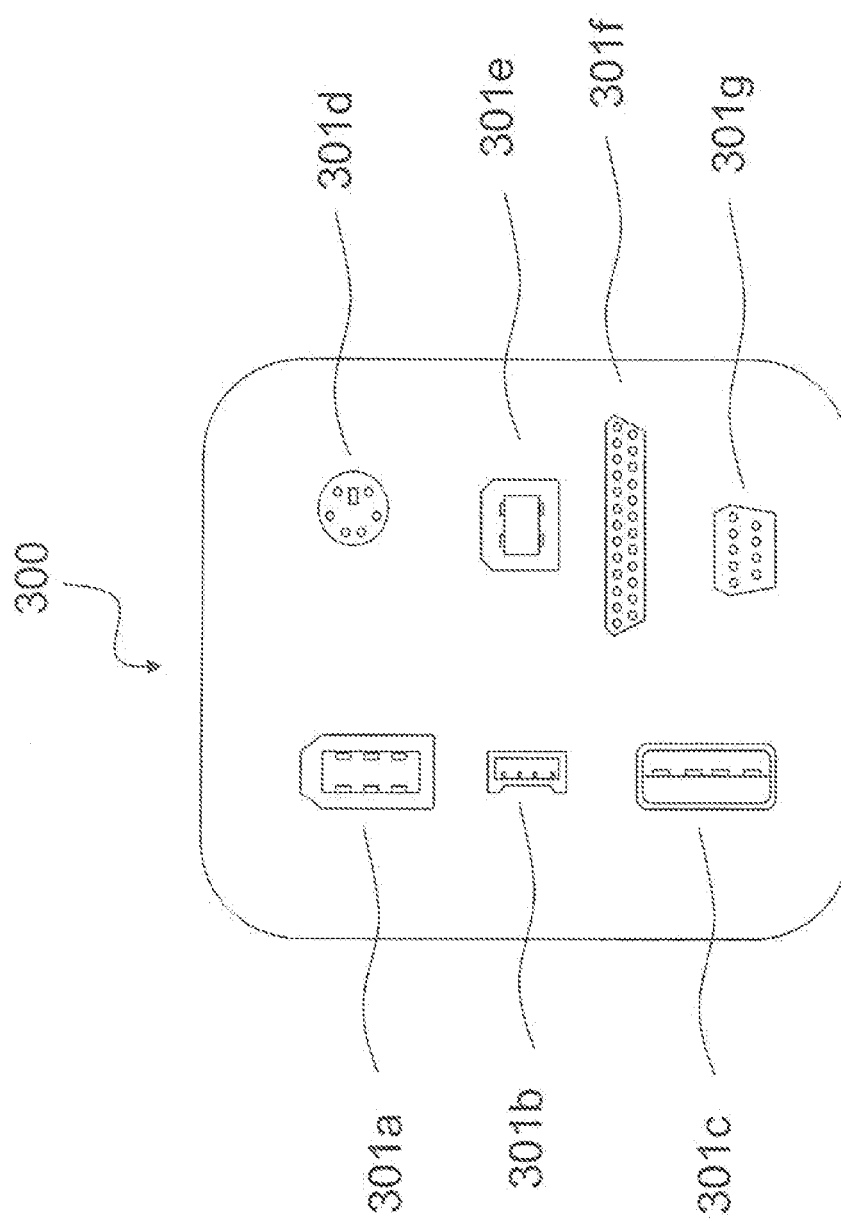
FIG. 10 is a schematic front view diagram of a power adapter in yet another exemplary embodiment of the present invention.

FIG. 10 is a schematic front view diagram of a power adapter 300 in yet another exemplary embodiment of the present invention. The adapter 300 has a plurality of ports 301*a*, 301*b*, 301*c*, 301*d*, 301*e*, 301*f*, 301*g* having different cross-sectional shapes to which a plurality of devices can be connected for recharging. The ports 301 may be any of a wide variety of ports used by popular electronic devices, such as USB, FireWire, PS/2, serial ports, parallel ports, and others. The ports 301*a*-301*g* may be located at any suitable location, on the front, rear, side, top, or bottom surfaces or sides of the adapter 300. The ports of the power adapter 300 may have cross-sections that are different from the cross-sections of the ports 301*a*-301*g* that are shown for illustrative purposes only.

Similar to the power adapter 100 of FIG. 1, the power adapters 200 and 300 of FIGS. 9 and 10 each have one or more AC plugs for plugging to corresponding AC outlets to receive AC power therefrom. The AC plugs may have different shapes to be compatible with AC outlets used in various different countries of the world.

Further, similar to the power adapter 100, the power adapters 200 and 300 of FIGS. 9 and 10 may have capabilities to convert a range of different AC voltages that are used throughout the world. By way of example, the power adapters 200 and 300 may be able to convert from AC power having a voltage range of 100V to 240V (and at frequencies 50 Hz or 60 Hz) to DC power having +5 V and +13 V and/or any other desirable voltages.

Figure 11:
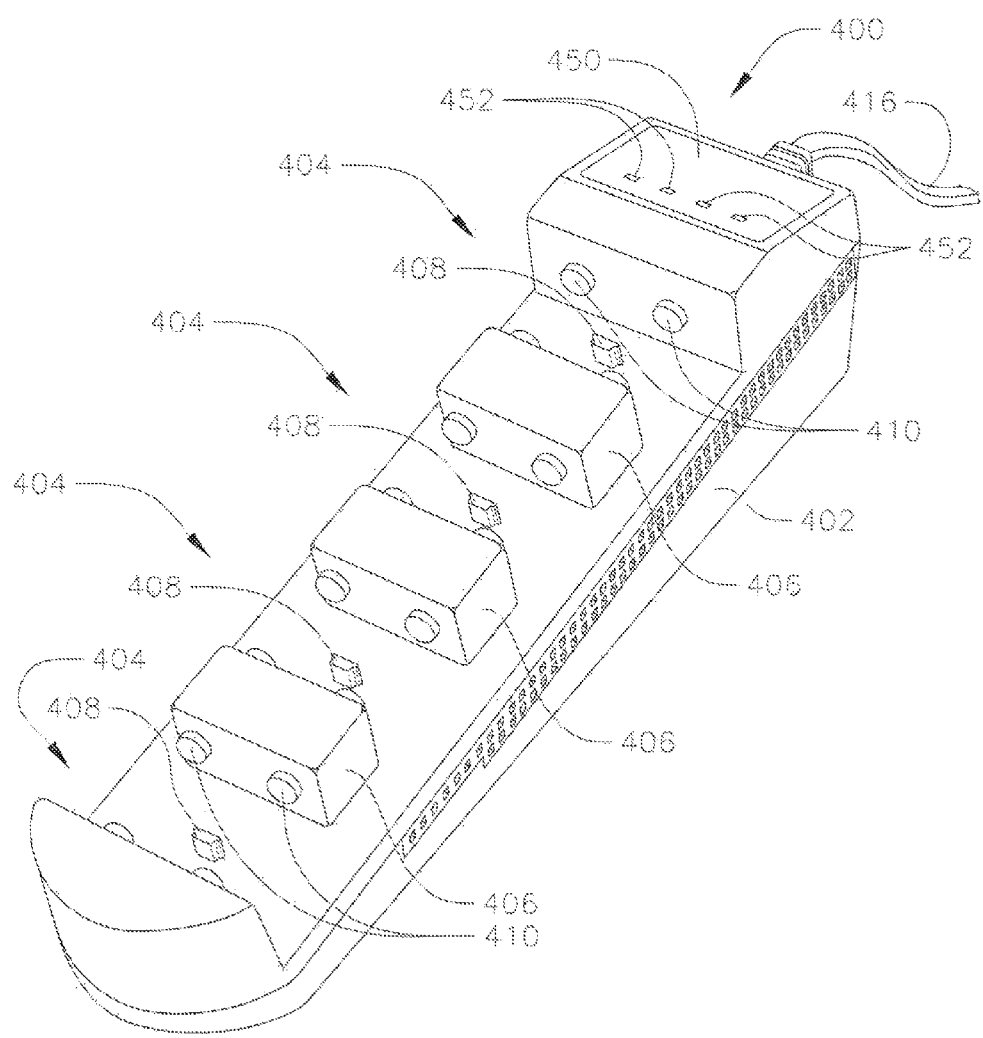
FIG. 11 is a perspective view of a video game controller charging system according to another exemplary embodiment of the present invention.
Figure 14:
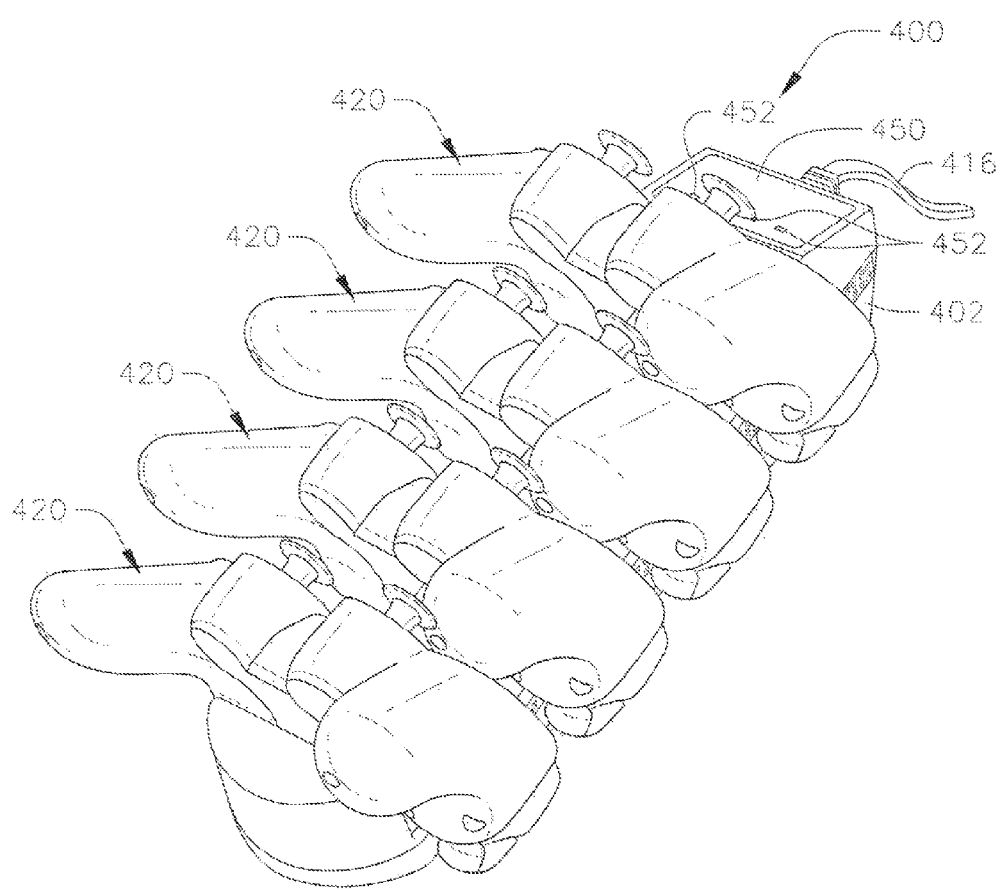
FIG. 14 is a perspective view of the video game controller charging system of FIG. 11 having video game controllers connected for charging.

FIGS. 11, 12, and 13 are perspective, top, and side views, respectively, of a video game controller charging system 400 according to another exemplary embodiment of the present invention. FIG. 14 is a perspective view of the video game controller charging system 400 having video game controllers 420 connected for charging. In one embodiment, the charging system 400 converts AC power from an AC power supply to DC power and supplying the DC power having a desired DC voltage to a connected CED accessory device, such as one of the video game controllers 420. In such an embodiment, the video game controller charging system 400 includes an AC-to-DC converter for converting AC power to DC power. In other embodiments, the video game controller charging system 400 may receive DC power from an external power source. In such cases, the external DC power may be provided by an external AC-to-DC converter that receives power from an AC outlet, and converts the received AC power to DC power.

The video game controller charging system 400 includes a base 402 and one or more docking bays 404, wherein each docking bay 404 is configured to receive a video game controller 420. The charging system 400 also includes one or more partitions 406 separating the docking bays 404. The charging system 400 further includes a DC port 408 within each of the docking bays 404 that is configured to electrically couple to one of the video game controllers 420 and deliver DC power to the coupled video game controller 420.

The DC ports 408 of the video game controller charging system 400 are configured to connect to a power input port of the video game controller 420 to be charged. In the present embodiment, the DC ports 408 are male mini-USB (universal serial bus) connectors adapted to connect to a female mini-USB connector on a video game controller for a video game console, such as the PlayStation3®. Alternatively, the DC ports 408 may be any electrical connectors suitable for coupling to a video game controller for another video game console, or for any other consumer electronics device to be charged, such as an MP3 player or accessory device.

In the present embodiment of the video game controller charging system 400, the partitions 406 include locators 410 for aligning the video game controller to the DC port 408. There are locators 410 on each of the two surfaces of the partitions 406, as well as the two surfaces of the base 402, which face the DC ports 408. There may be two locators 410 on each surface described, i.e., four locators 410 adjacent each video game controller 420. Each pair of opposite surfaces, a portion of the base 402, a corresponding docking bay 404, and/or the locators 410 may comprise a structure for providing physical support to one of the video game controllers 420 during charging. While the locators 410 in the illustrated embodiment of FIG. 11 are button-shaped, the shape of the locators 410 is not limited thereto. Also, the locators 410 may be spring-loaded in order to facilitate aligning and maintaining a required position of the video game controller 420 for coupling to the corresponding DC port 408. In other embodiments, the locators 410 may not be spring-loaded and the video game controller 420 may be aligned by the locators 410 through any other suitable method or mechanism, such as a pressure fit.

In use, the DC ports 408 are connected to power input ports of the video game controllers 420 to be charged, as shown in FIG. 14. When one or more video game controllers 420 need to be recharged, connecting the video game controllers 420 to the charging system 400 is as easy as inserting each of the video game controllers 420 into one of the docking bays 404. As described above, the locators 410 aid in aligning the video game controller 420 into the docking bay 404 such that the power input port of the video game controller 420 slides down onto and connects to the DC port 408. The charging system 400 is connected to a power supply through its own power input (either AC power which is converted to DC power using an internal AC-to-DC converter or externally provided DC power). The charging system 400 then provides power to the video game controller 420 to recharge the batteries of the video game controller 420.

While the embodiment described above uses a vertical orientation, with each of the video game controllers 420 being dropped from above into the docking bays 404, other orientations may be used as well. In one alternative embodiment, for example, the video game controllers 420 may be received horizontally into the docking bays 404, and electrically coupled to DC ports 408 having a horizontal orientation instead of the vertical orientation shown in FIGS. 11-14.

The present embodiment of the video game controller charging system 400 can charge up to four video game controllers 420 concurrently, or it can charge one at a time. Alternative embodiments of the charging system 400, however, may be configured to charge more than four video game controllers 420 concurrently. The power supply for the charging system 400 may be a power cord 416 that has a plug for connecting to an AC power supply or a DC power supply. In one embodiment, the charging system 400 also includes an AC-to-DC converter 440 (see FIG. 15) electrically coupled between the power cord 416 and the DC ports 408 for converting AC power to DC power having +5 V or any DC voltage suitable for delivery to the video game controller 420. The AC-to-DC converter 440 may be in the base 402 or external to the base 402. The power cord 416 may be removably connected to the base 402, or may be fixedly coupled to the base 402. In an alternative embodiment, the power input may be a USB port that connects to a CED (e.g., a video game console) to obtain DC power from the CED. The charging system 400 provides this DC power to the DC ports 408 for delivery to the video game controllers 420. In other embodiments, DC power may be provided as input to the charging system 400, where the DC power may be provided by an external AC-to-DC converter. In such embodiments, the power input may be DC power converted from AC power from a wall outlet and converted to DC power using the external AC-to-DC converter.

The video game controller charging system 400 may also include an indicator panel 450 that indicates a status of the charging system 400. In the present embodiment, the indicator panel 450 includes four LED assemblies 452. Each of the four LED assemblies 452 corresponds with one of the four DC ports 408, so as to indicate the charging status of the video game controller 420 being charged at the respective DC port 408. Each of the LED assemblies 452 includes at least two LEDs having different colors. For example, each of the LED assemblies 452 in the present embodiment includes a red LED and a green LED. While the respective video game controller 420 is being charged, the red LED is emitted to indicate that the video game controller 420, or more specifically, the battery inside the video game controller 420, is currently being charged. When the respective video game controller 420 is finished charging, the green LED is emitted to indicate that the charging has been completed. In another embodiment, the green LED may be emitted to indicate that the video game controller is being charged, while the red LED is emitted to indicate that the charging has been completed. In alternative embodiments, each of the LED assemblies 452 may include different colors of LEDs and/or different numbers of LEDs (e.g., three LEDs) to indicate respective charging status.

In another alternative embodiment, each of the LED assemblies 452 may include a single LED and may illuminate with a first color (e.g., red) to indicate that the charging system 400 is currently charging a video game controller 420. Another LED assembly 452 may illuminate with a second color (e.g., green) to indicate that the charging system 400 has completed charging. The LED assemblies may be electrically coupled to a current detector 460 (see FIG. 15) which provides the signals to illuminate the LEDs. In one embodiment, the charging system 400 may stop providing power to the video game controller 420 when the video game controller's internal battery is completely charged.

Figure 15:
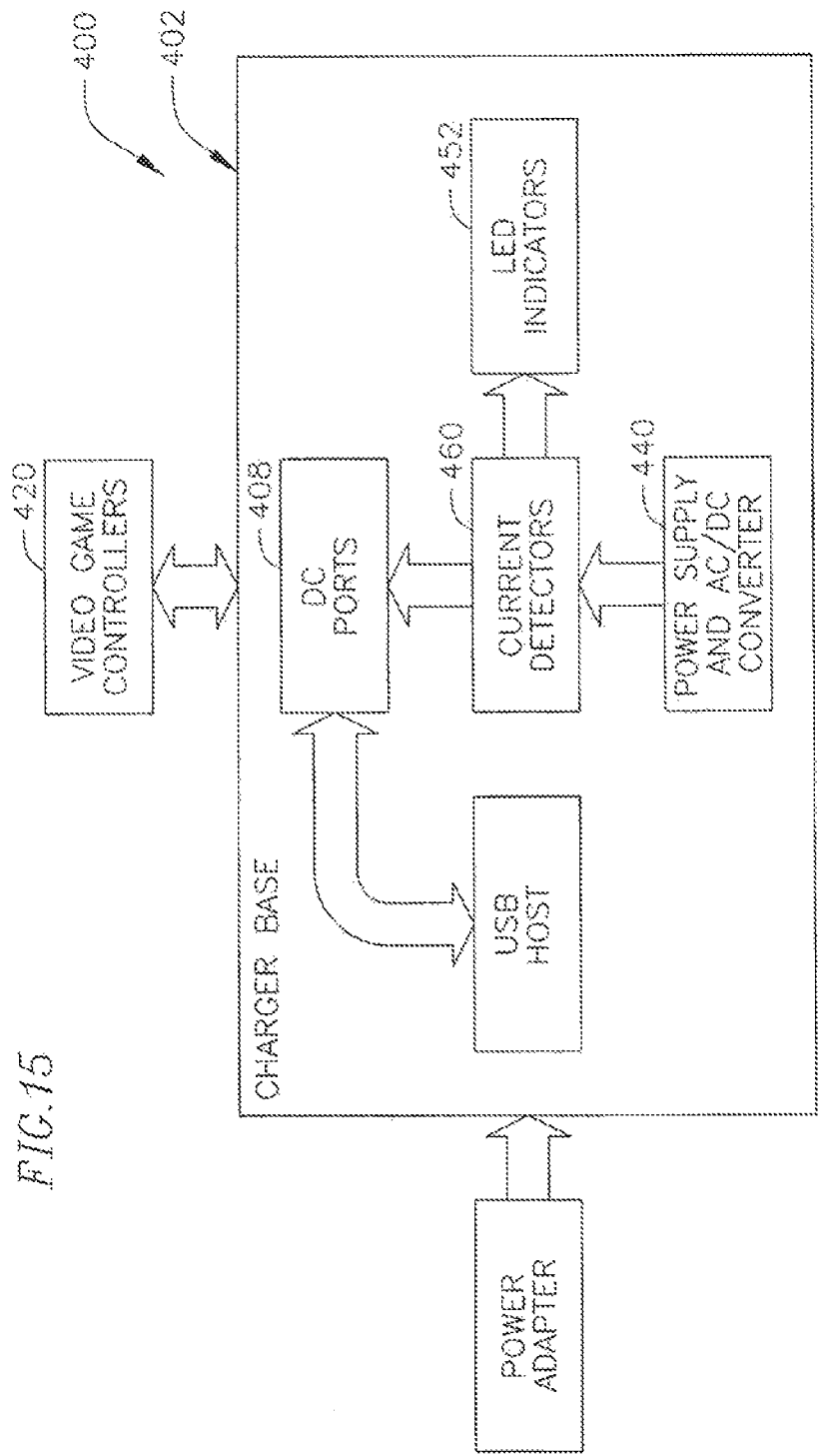
FIG. 15 is a block diagram of the video game controller charging system of FIG. 11.

FIG. 15 is a block diagram showing some of the above-described components of the video game controller charging system 400 in schematic form. As can be seen in FIG. 15, the charging system 400 includes DC ports 408, each of which is configured to be electrically coupled with a video game controller 420. Through the DC ports 408, the charging system 400 is capable of supplying the power received from a power adapter or a power supply to the video game controllers 420 for charging.

In one embodiment, the base 402 includes an AC-to-DC converter 440 for converting input AC power to DC power for charging the video game controller 420. In other embodiments, the charging system 400 may be provided with an external AC/DC converter, DC power via a mini-USB port, or any other suitable DC power supply. The charging system 400 may include a USB host used to provide DC power via a mini-USB port.

In one embodiment, the video game controller charging system 400 includes one or more current detectors 460 for detecting the amount of current being provided by the power supply to the video game controllers 420 through the DC ports 408. If sufficient current, i.e. a predetermined amount of current, is detected by one of the current detectors 460, the corresponding LED (e.g., a red LED) is emitted to indicate that the video game controller 420 in the corresponding docking bay 404 is being charged. Then, when the charging has been completed, less current is detected because the battery in the accessory device is already substantially fully charged. In this case, another LED (e.g., a green LED) is emitted to indicate that charging has been completed.

Figure 16:
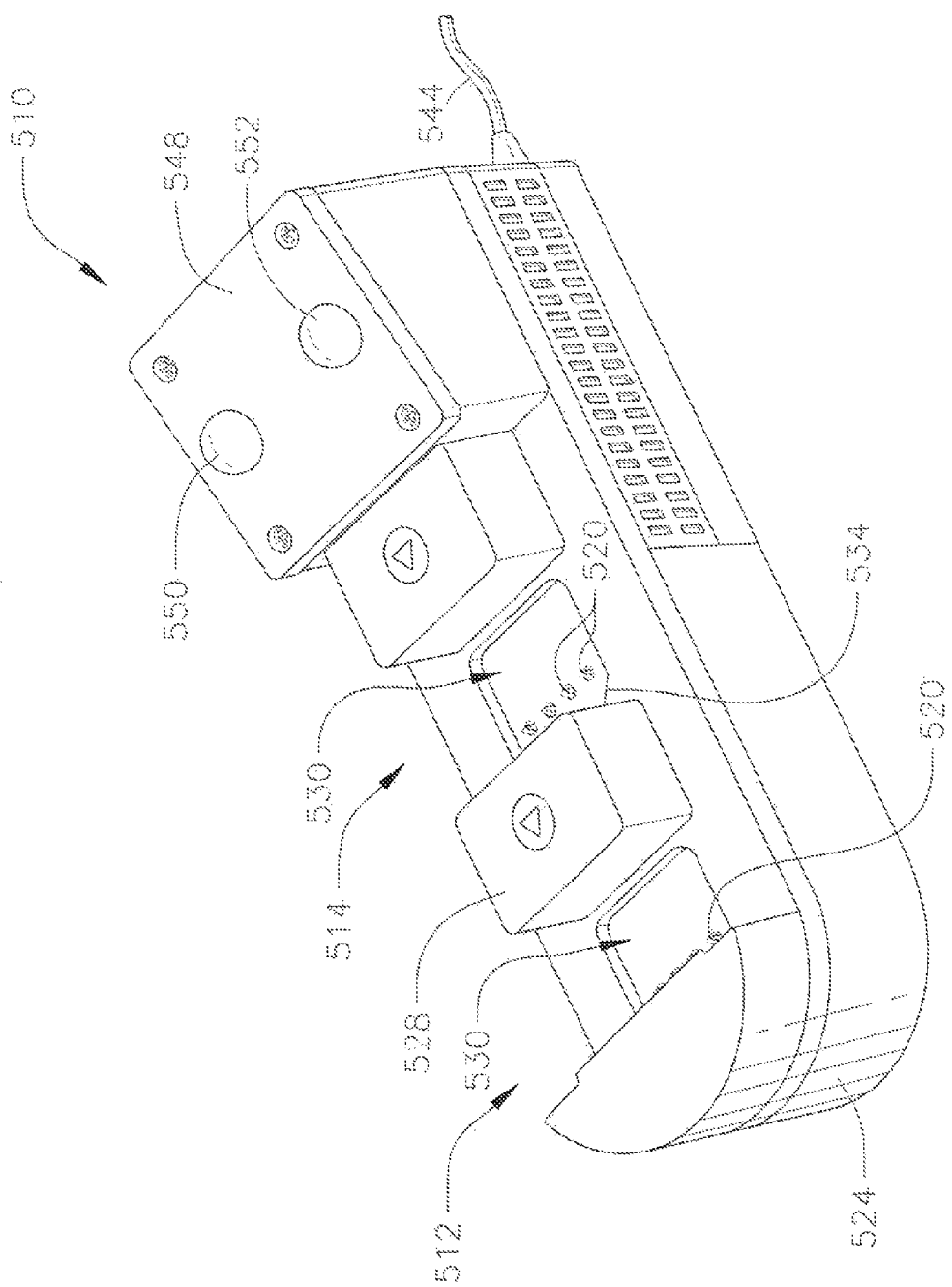
FIG. 16 is a perspective view of a charging station according to an exemplary embodiment of the invention.

Another exemplary embodiment of the invention, shown in FIGS. 16-23, relates to a charging station for a consumer electronics device (CED), and more particularly, to a charging station for one or more hand-held controllers for a video game console. A charging station 510 according to an exemplary embodiment of the invention is shown in FIG. 16. The charging station 510 includes two docking bays 512, 514 for two accessory devices, which in one embodiment are hand-held controllers for a video game console. The docking bays 512, 514 are dimensioned to accept adapters 516 (see FIG. 17). Electrical contacts 520 in the docking bays 512, 514 make contact with electrical leads 522 on the adapters 516 (see FIG. 19B) to provide an electrical connection through which power can be transmitted. The adapters 516 are electrically coupled to the power input port on the hand-held controllers. In one embodiment, the adapters 516 drop-fit easily into the docking bays 512, 514, thus providing a fast and easy connection of the hand-held controllers to the charging station 510.

As shown in FIG. 16, the charging station 510 includes a base 524 with two docking bays 512, 514. The docking bays 512, 514 are each dimensioned to accept a hand-held controller 526 (see FIGS. 20, 21). The two docking bays 512, 514 are separated by a partition 528 positioned between them. Each of the docking bays 512, 514 includes a recess 530 at the bottom of the docking bay. The recess 530 has four electrical contacts 520 positioned in the recess 530. In other embodiments, the recess may include more than four or less than four electrical contacts. These contacts 520 are shown positioned in a linear arrangement in the recess 530, but they could be positioned in any suitable arrangement.

Figure 17:
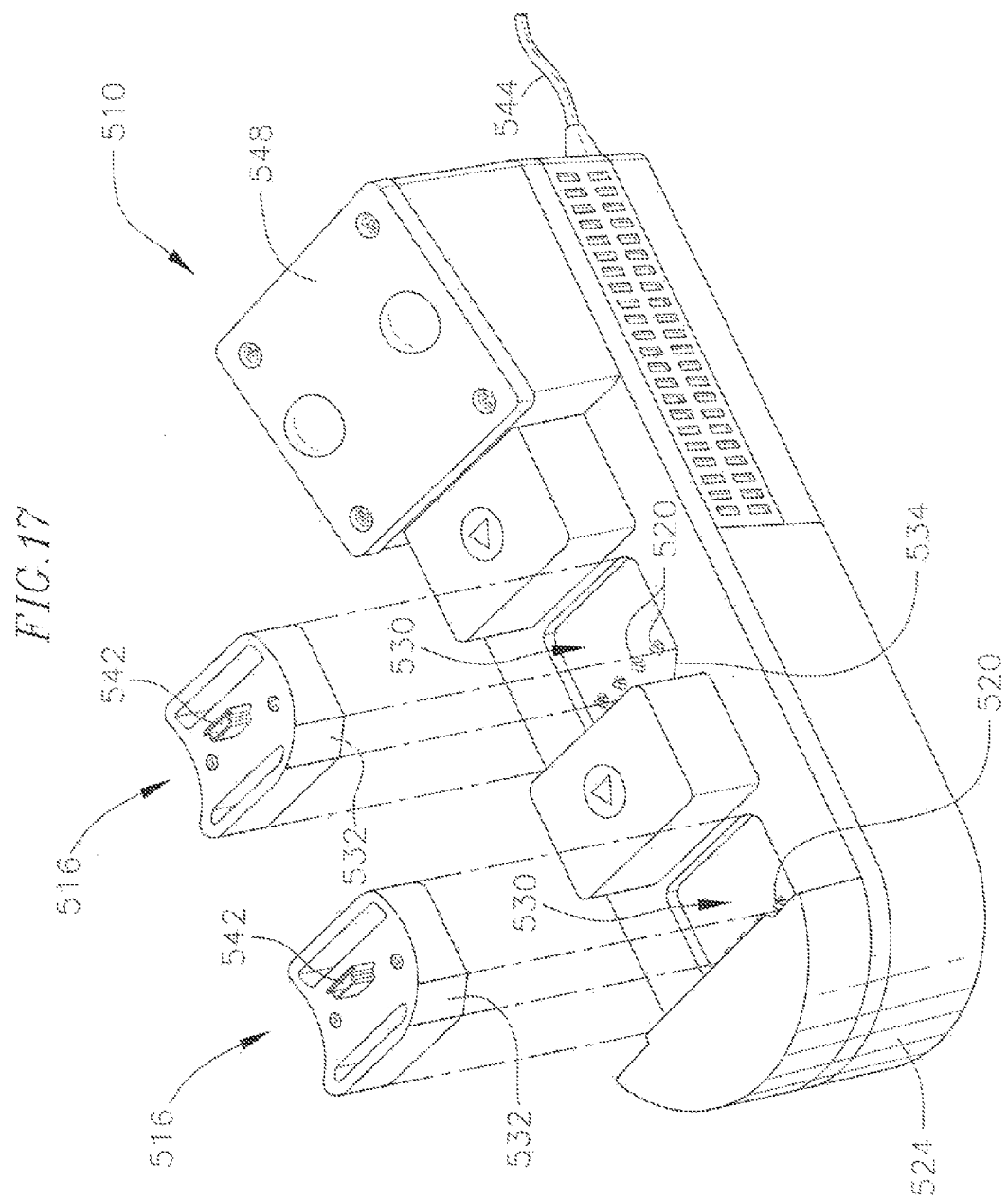
FIG. 17 is a perspective view of a charging station and two adapters according to an exemplary embodiment of the invention.

The recesses 530 are dimensioned to receive an adapter 516 into the recess 530. As shown in FIG. 17, the adapters 516 can be dropped vertically into the docking bays 512, 514 and into the recesses 530. When the adapters 516 are placed into the recesses 530, electrical leads 522 (see FIG. 19B) on the bottom side 538 of the adapters 516 contact the electrical contacts 520 in the recesses 530. The electrical leads 522 on the adapter 516 thus make an electrical connection with the electrical contacts 520 in the recess 530. The electrical leads 522 on the adapter 516 match the arrangement of the electrical contacts 520 such that each electrical lead 522 makes physical contact with an electrical contact 520 when the adapter 516 is placed in the recess 530. In one embodiment, as will be described later, the electrical contacts 520 are spring loaded so as to make sufficient contacts with the electrical leads 522.

In other embodiments, the adapters 516 and the docking bays 512, 514 have matching shapes, such as, for example, a molded male and female matching shape, which is not limited to the recess 530 described above. The docking bays 512, 514 and the adapters 516 can have any suitable shapes that allow the electrical contacts 520 of the docking bays 512, 514 to make contact with the electrical leads 522 of the adapters 516. Thus, many molded configurations, including ridges, grooves, and other shapes, can be used to enable the docking bays 512, 514 to receive the adapters 516. These examples are illustrative only, and not limiting.

Figure 18:
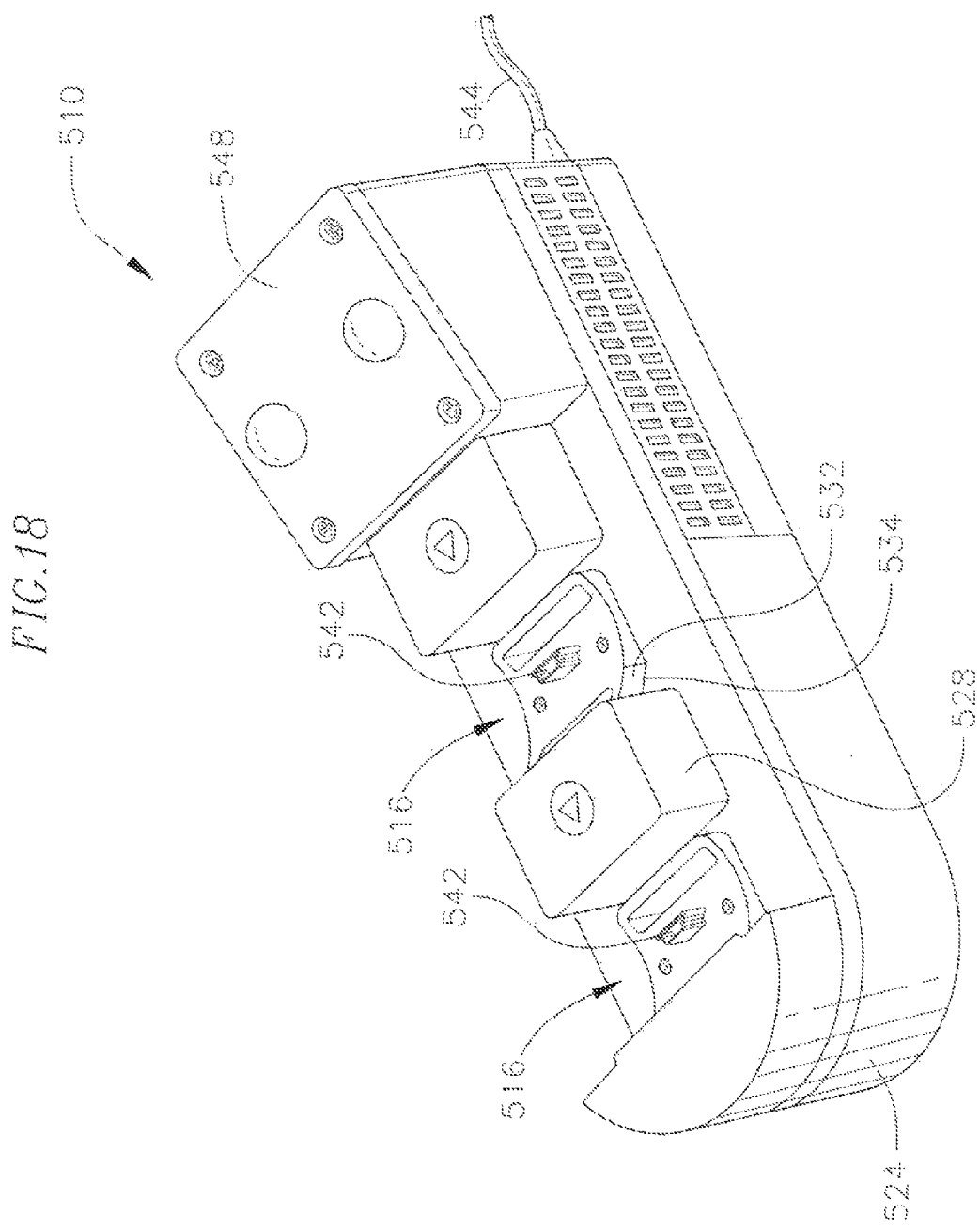
FIG. 18 is a perspective view of a charging station with two adapters according to an exemplary embodiment of the invention.

As shown in FIG. 18, in one embodiment, the adapters 516 and recesses 530 are shaped such that the adapter 516 can only be placed into the recess 530 in one orientation. In the embodiment shown, the adapter 516 includes at least one angled edge 532, and the recess 530 includes a matching angled corner 534. This geometry ensures that the adapter 516 will be placed in the recess 530 in the proper orientation, so that the electrical contacts 520 meet the electrical leads 522. Other geometric configurations or features could be used to accomplish this function, such as matching prongs and recesses, or other types of shaped edges. Additionally, this feature is optional, as the adapter 516 could be made to fit into the recess 530 in multiple orientations.

Figure 19A:
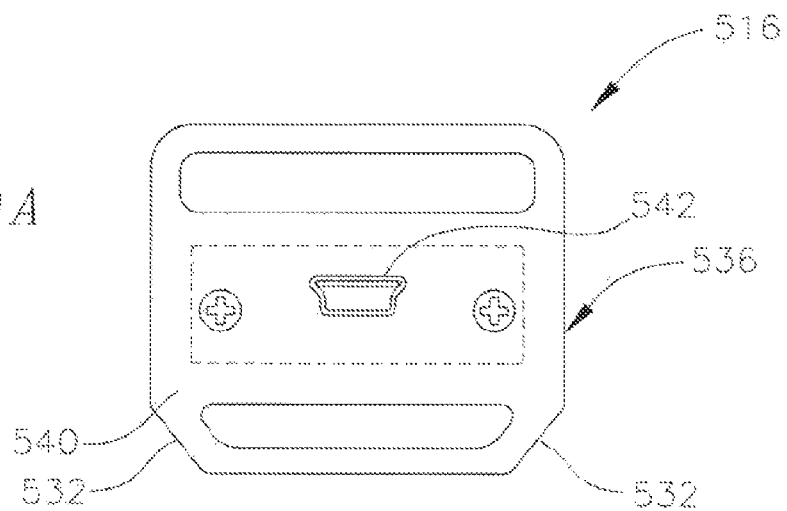
FIG. 19A is a top plan view of an adapter according to an exemplary embodiment of the invention.
Figure 19B:
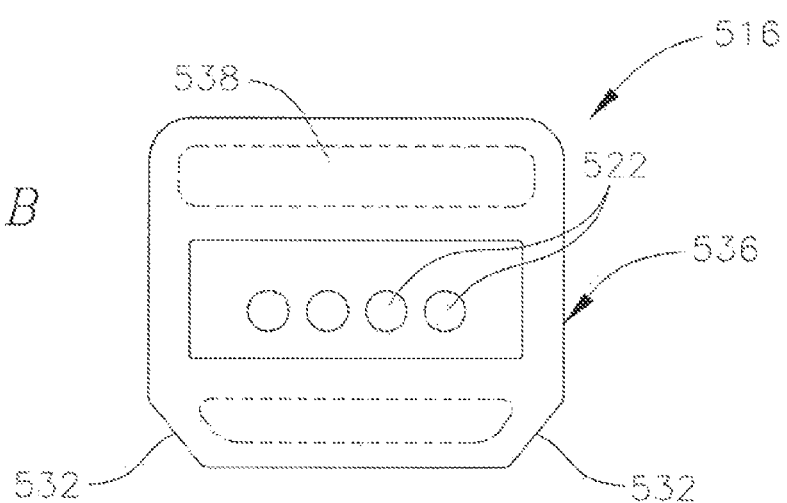
FIG. 19B is a bottom plan view of an adapter according to an exemplary embodiment of the invention.
Figure 19C:
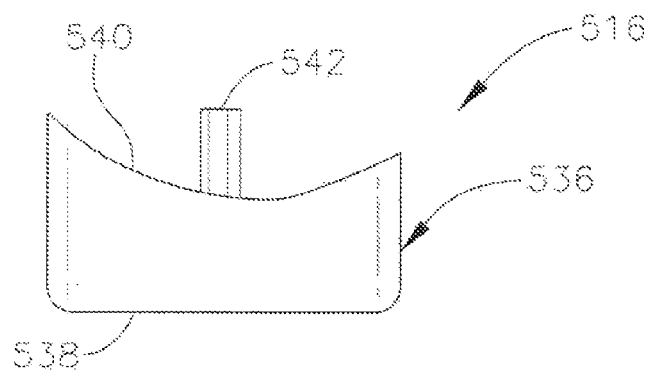
FIG. 19C is a side plan view of an adapter according to an exemplary embodiment of the invention.

As shown in FIGS. 19A-19C, the adapter 516 includes a body 536 with the angled edge 532. The electrical leads 522 are located on a bottom side 538 of the body 536. The top side 540 of the body 536 includes a connector 542 that is configured to connect to the power input port of the accessory device to be charged. In one embodiment, the connector 542 is a male mini-USB (universal serial bus) connector adapted to connect to a female mini-USB connector on a hand-held controller for a video game console, such as the PlayStation3®.

Figure 20:
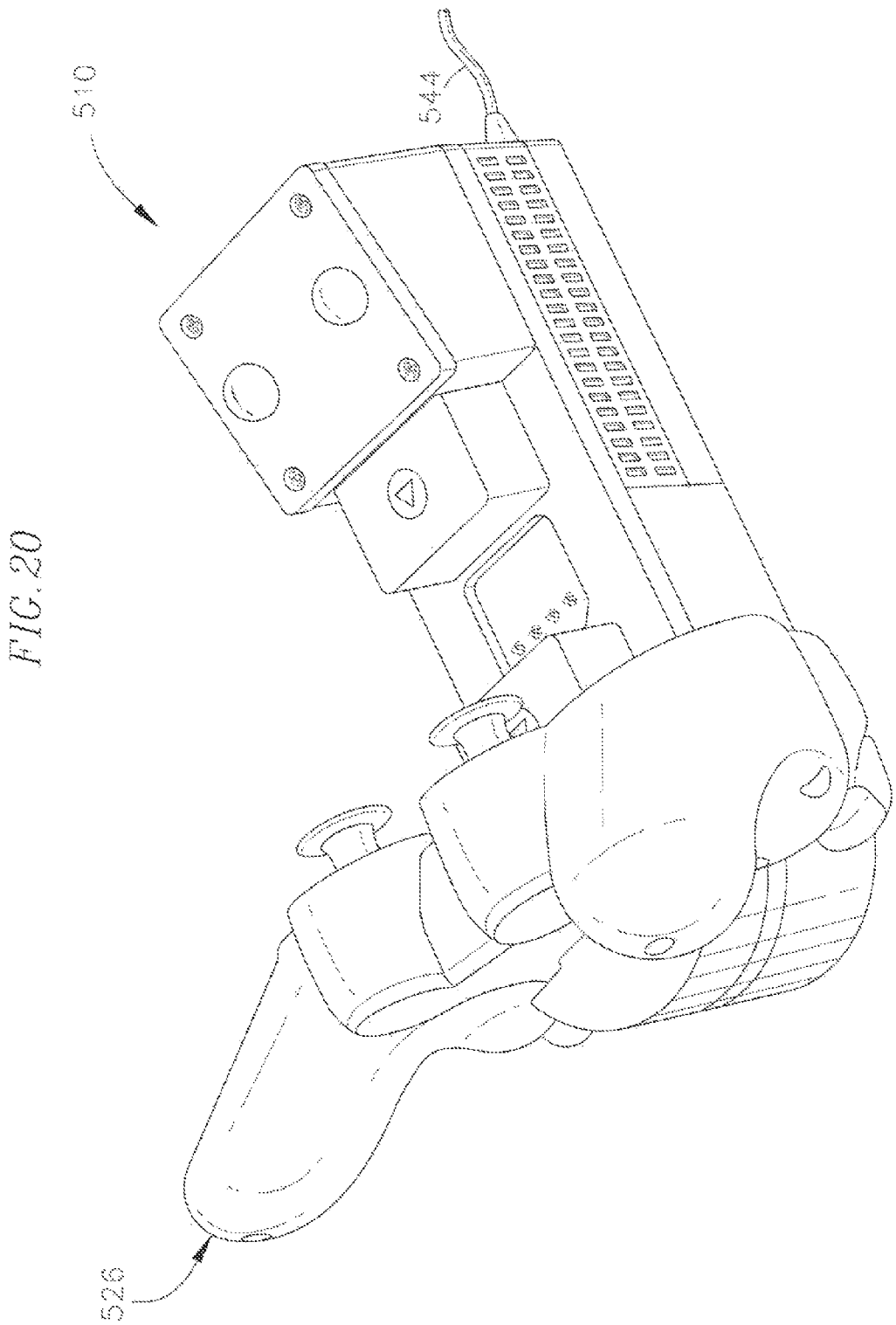
FIG. 20 is a perspective view of a charging station with a video game controller according to an exemplary embodiment of the invention.
Figure 21:
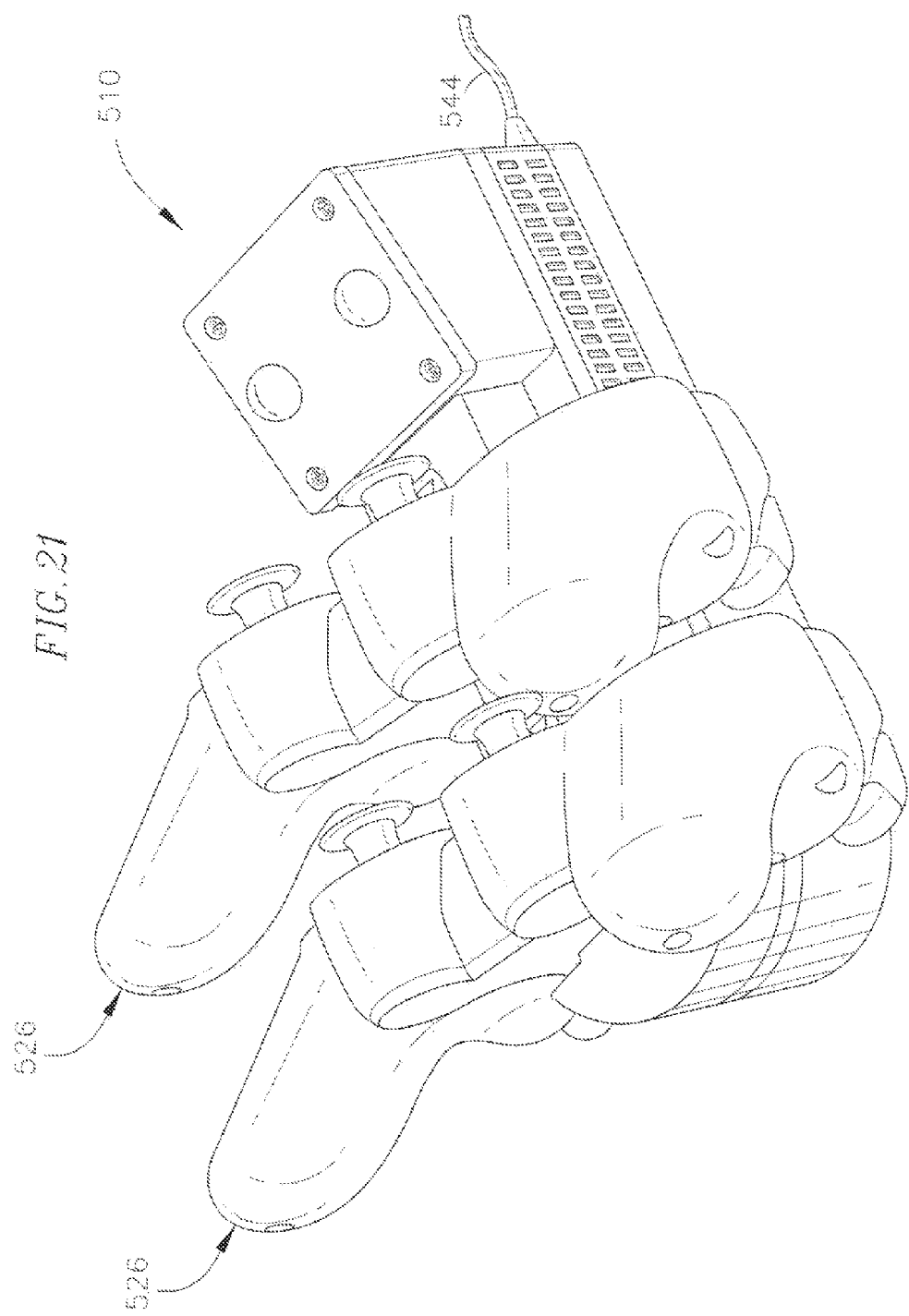
FIG. 21 is a perspective view of a charging station with two video game controllers according to an exemplary embodiment of the invention.

In use, the connector 542 on the adapter 516 is connected to the power input port of the accessory device to be charged, such as the hand-held controller 526 shown in FIGS. 20 and 21. The adapter 516 is a small and light-weight piece that connects snugly to the power input port of the hand-held controller 526. The adapter 516 can remain with the hand-held controller 526 at all times, even when the controller 526 is not being charged in the charging station 510. When the hand-held controller 526 is in use during operation of a video game, when the controller 526 is stored, and when it is charging, the adapter 516 can remain connected to (and physically mounted on) the controller 526. The adapter 516 is small and light weight, so that it does not interfere with operation of the controller 526. When the controller 526 needs to be recharged, connecting it to the charging station 510 is as easy as dropping it into one of the docking bays 512, 514. The adapter 516 slides easily into the recess 530, and the electrical leads 522 on the bottom of the adapter 516 make an electrical connection with the electrical contacts 520 in the recess 530. The charging station 510 is connected to a power supply through its own power input. The charging station 510 then provides power to the controller 526 to recharge the controller's batteries. This recharging process is fast and easy, as the adapter 516 allows the controller 526 to be simply dropped into place, rather than carefully connected to a fragile port or connector.

While the embodiment described above uses a vertical orientation, with the controller 526 and adapter 516 being dropped from above into the recess 530, other orientations may be used as well. In one embodiment, the adapter 516 is received horizontally into one of the docking bays 512, 514, and the electrical contacts 520 in the docking bay and electrical leads 522 on the adapter 516 are arranged vertically to make contact with each other when the adapter 516 is horizontally placed into the docking bay. In one embodiment, the adapter 516 is placed into the docking bay by a push-fit, press-fit, or snap-fit, rather than simply a drop-fit. These fitting engagements are fast and easy to use, and also provide a reliable connection between the adapter 516 and charging station. In another embodiment, the charging station includes prongs that hold the controller and adapter into place after they have been placed (vertically or horizontally) into the docking bay to obtain a complete electrical connection.

The charging station 510 can charge two controllers 526 simultaneously (or concurrently), or it can charge one at a time. The power input for the charging station 510 may be a power cord 544, as shown in FIG. 20, that connects to an alternating current (AC) power supply. In this case, the charging station 510 includes an AC/DC converter electrically coupled between the power input and the electrical contacts 520, in order to provide direct current power to the contacts 520 and from there to the controllers 526. The AC/DC converter 546 may be internal to the base 524 or external. In another embodiment, the power input is a USB port that connects to the CED to obtain DC power from the CED. The charging station provides this DC power to the electrical contacts 520 and from there to the controllers 526. In other embodiments, DC power may be provided as input to the charging station 510, where the DC power may be provided by an external AC/DC converter.

The electrical contacts 520 may include a spring coupling the contacts 520 to the base 524. The weight of the controller 526 pushes the adapter 516 down into the recess 530, pressing the electrical leads 522 on the adapter 516 against the electrical contacts 520. The spring pushes back up on the contacts 520, pushing them against the electrical leads 522 to ensure a complete electrical connection.

The charging station 510 may also include an indicator 548 that indicates a status of the charging station 510. In one embodiment, the indicator 548 includes two LED assemblies 550, 552 (see FIG. 16). The LED assemblies 550, 552 correspond with the first and second docking bays 512, 514, respectively, so as to indicate the charging status of the hand-held controller 526 (or any other suitable accessory device) being charged in the respective docking bay. Each of the LED assemblies 550 and 552 includes at least two LEDs having different colors. By way of example, each of the LED assemblies 550 and 552 in one embodiment includes a red LED and a green LED. While the respective hand-held controller 526 is being charged, the red LED is emitted to indicate that the hand-held controller 526 (i.e., the battery inside the hand-held controller 526) is currently being charged. Further, when the respective hand-held controller 526 is finished charging, the green LED is emitted to indicate that the charging has been completed. In other embodiments, each of the LED assemblies 550, 552 may include different color LEDs and/or different number (e.g., three) of LEDs to indicate respective charging status.

In still other embodiments, each of the LED assemblies 550, 552 may include a single LED, and may be referred to as LEDs 550, 552. The first LED 550 illuminates with a first color, for example red, to indicate that the charging station 510 is currently charging an accessory device. The second LED 552 illuminates with a second color, for example green, to indicate that the charging station 510 is finished charging. The LEDs 550, 552 may be electrically coupled to a current detector 521 (see FIG. 22) which provides the signals to illuminate the LEDs. In one embodiment, the charging station 510 stops providing power to the controller 526 when the controller's internal battery is completely charged.

Figure 22:
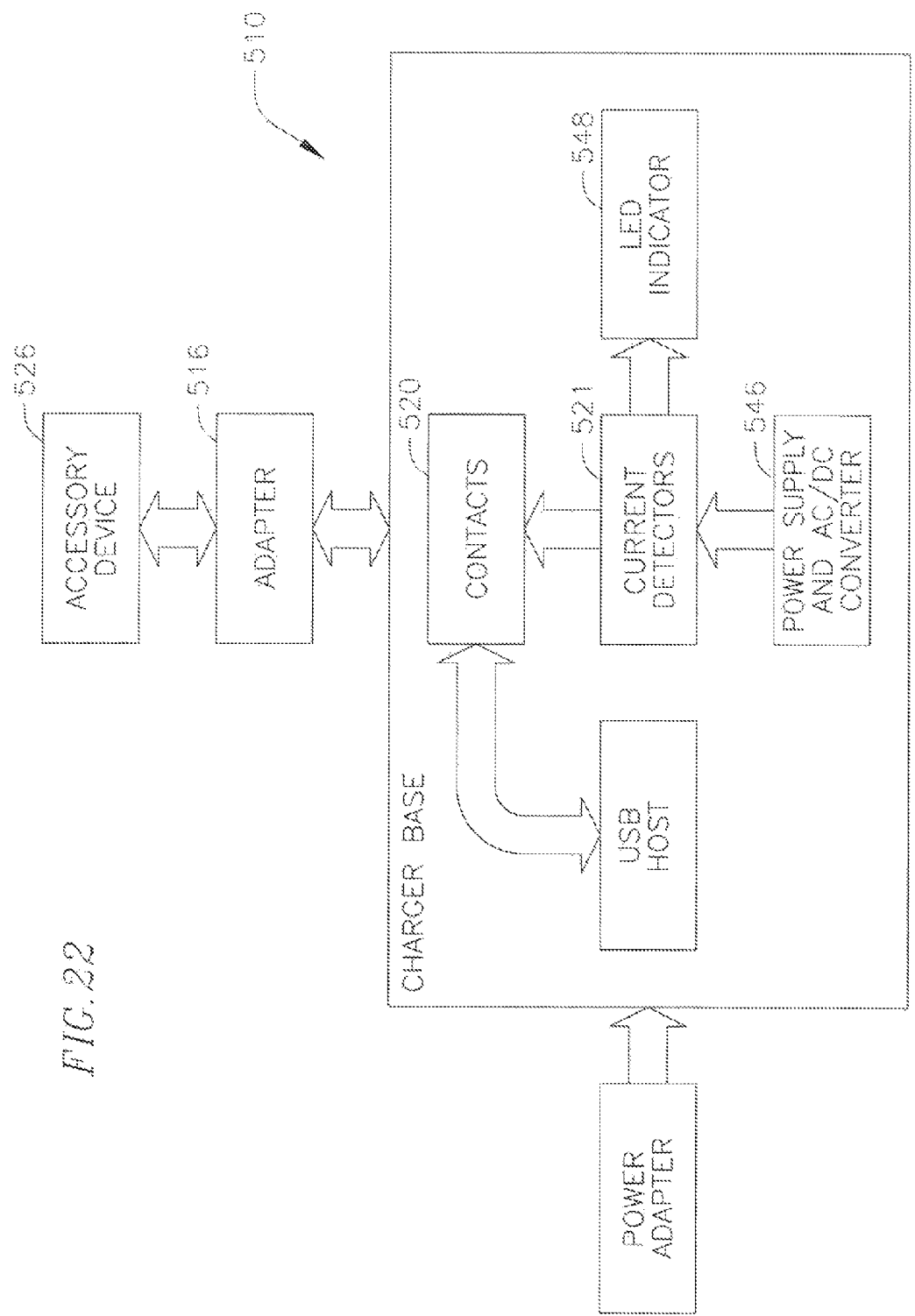
FIG. 22 is a block diagram of a charging station and an accessory device according to an exemplary embodiment of the invention.

A block diagram of the charging station 510 is shown in FIG. 22, showing some of the above-described components of the charging station in schematic form. As can be seen in FIG. 22, the charging station (or charger base) 510 includes electrical contacts 520 that are adapted to be electrically coupled with the accessory device 526 via the adapter 516. This way, the charging station 510 is capable of supplying the power received from a power adapter or a power supply to the accessory device 526 (e.g., for charging).

In one embodiment, the charger base includes the AC/DC converter 546 for converting input AC power to DC power for charging the accessory device 526. In other embodiments, the charging station 510 may be provided with DC power via a mini-USB port, an external AC/DC converter, or any other suitable DC power supply. The charging station 510 may include a USB host used to provide DC power via mini-USB port.

In one embodiment, the charging station 510 includes a current detector 521 for detecting the amount of current being provided by the power supply to the accessory device 526 through the contacts 520. If sufficient current (e.g., a predetermined amount of current) is detected by the current detector 521, the corresponding LED (e.g., a red LED) is emitted to indicate that the accessory device 526 is being charged. Then, when the charging has been completed, less current is detected because the battery in the accessory device is already substantially fully charged. In this case, another LED (e.g., a green LED) is emitted to indicate that charging has been completed.

Figure 23A:
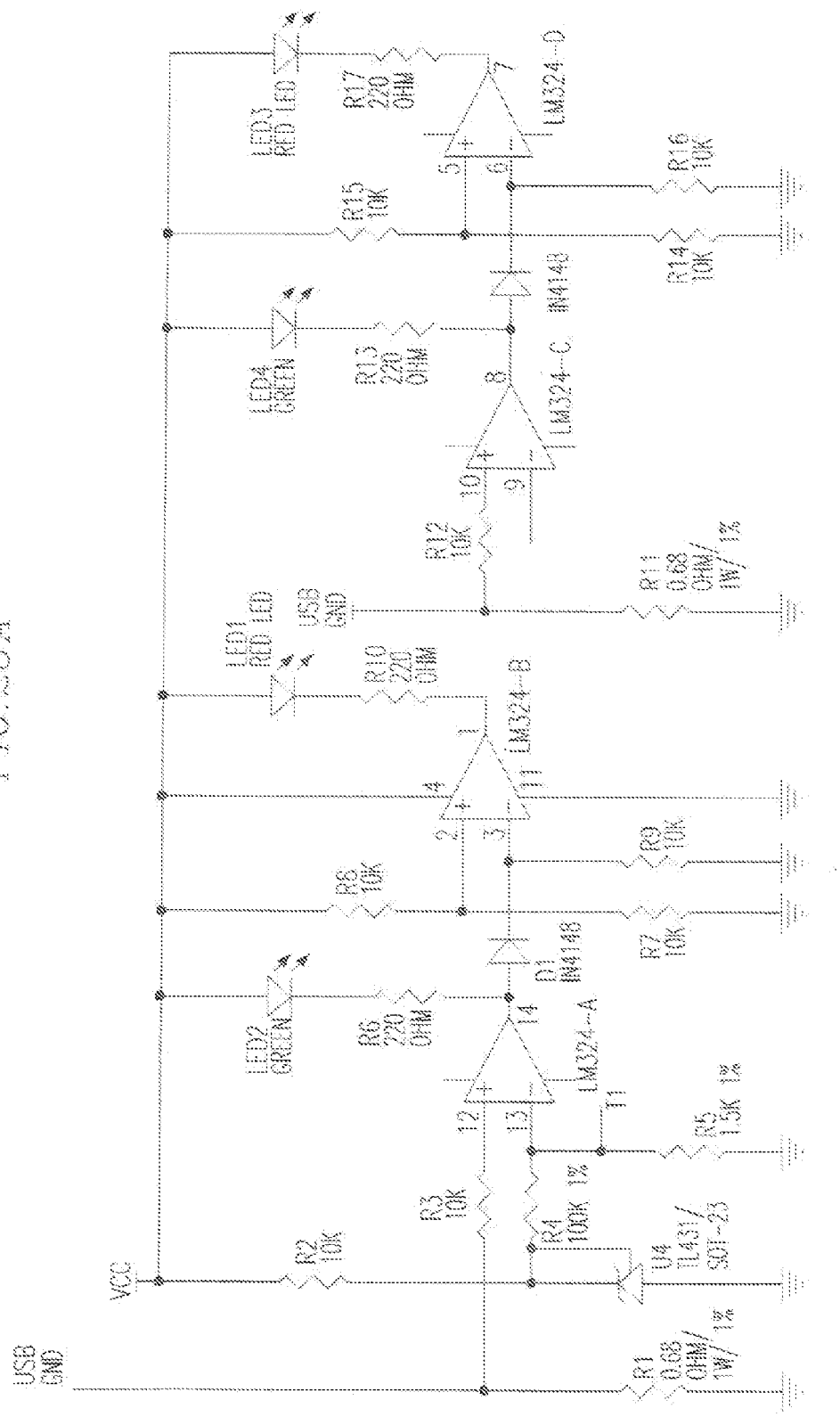
FIGS. 23A-B are a circuit diagram of a charging station according to an exemplary embodiment of the invention.
Figure 23B:
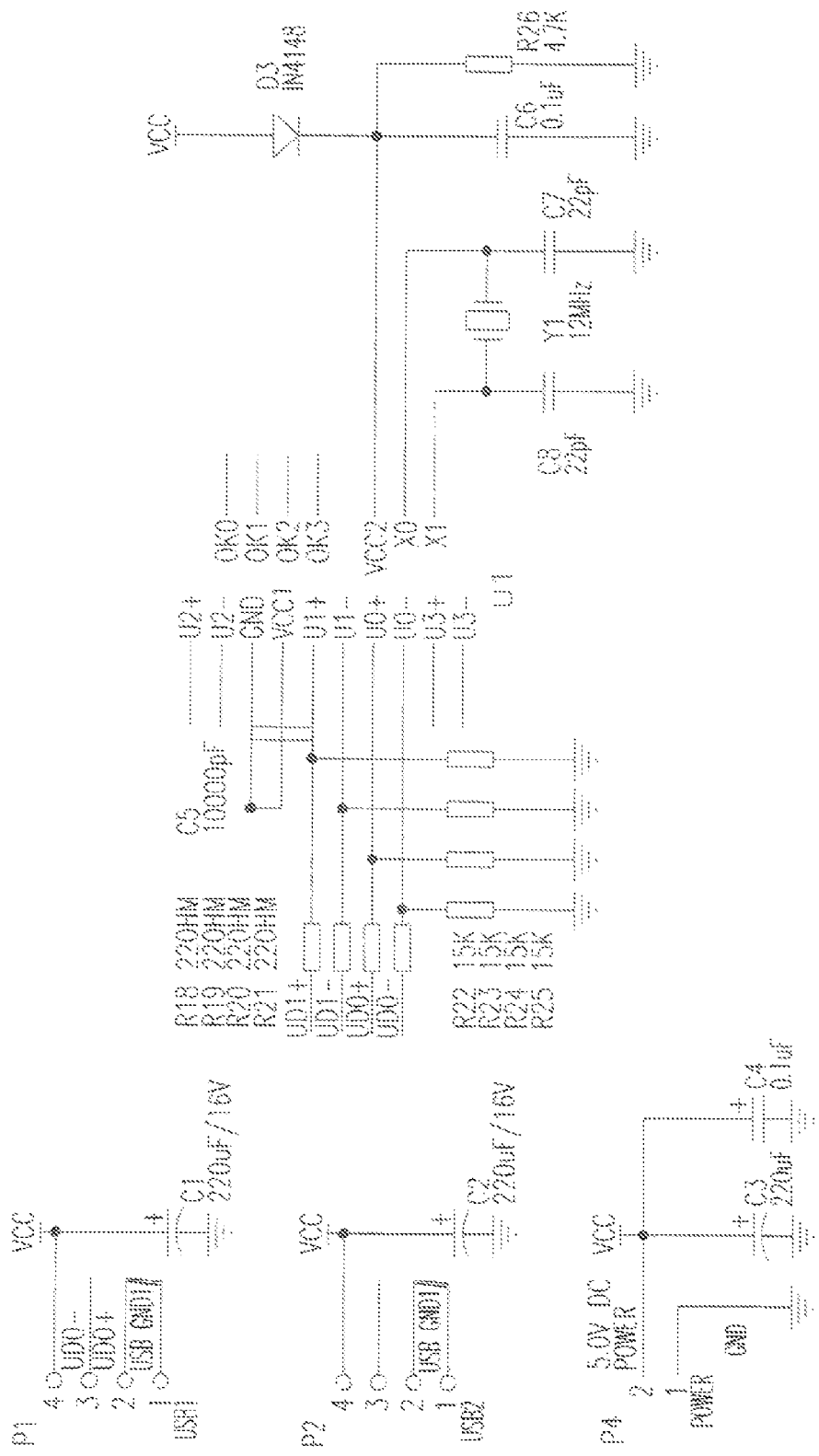

A circuit diagram of the charging station 510 is shown in FIGS. 23A and 23B. As can be seen in FIGS. 23A and 23B, each of the LED assemblies includes two LEDs (green LED LED2 and red LED LED1, or green LED LED4 and red LED LED3). As can also be seen in FIGS. 23A and 23B, the current detector 521 in one embodiment is implemented using a quad operational amplifier chip LM324. The current detector 521 controls light emission of LEDs LED1 and LED2 and/or the light emission of LEDs LED3 and LED4, depending on whether or not sufficient current for charging a respective accessory device is detected.

While the CED is described in the above embodiments as a video game console, and the accessory device is described as a video game controller for the video game console, the invention may be used for other CEDs and accessory devices, such as cell phones, wireless headsets, personal computers and related peripheral devices, and many other electronic devices. This list is meant to be illustrative only, and not limiting.

Also, while some of the embodiments are primarily described as a charging system for charging video game controllers, the present invention is not limited thereto. The charging system in various embodiments may be used or be modified to be used for charging any suitable hand-held electronics devices or accessories, such as, for example, hand-held video games, or hand-held audio or multimedia players such as MP3 players, without departing from the spirit or scope of the present invention.

It will be appreciated by those with ordinary skill in the art that the invention can be embodied in other specific forms without departing from the spirit or essential character thereof. The embodiments described above should be considered to be illustrative and not restrictive. The scope of the present invention is defined by the appended claims and their equivalents.

What is claimed is:

1. A video game controller charging system for charging at least one video game controller, each having a female power input receptacle, the video game controller charging system comprising:

a base including at least one recess and at least one electrical contact in each of the at least one recess;

a single power input interface;

at least one adapter, each comprising at least one electrical lead and being receivable in a respective one of the at least one recess such that the at least one electrical lead contacts the at least one electrical contact in the respective recess; and at least one male DC port electrically coupleable to the single power input interface, each of the at least one male DC port being disposed on a respective adapter of the at least one adapter and being configured to electrically and mechanically couple to the female power input receptacle of a respective one of the at least one video game controller to provide DC power to the female power input receptacle without the use of an external or retractable cable when the respective, adapter is received in the respective recess, and such that the adapter may remain attached to the video game controller when the video game controller is in use during operation of a video game.

2. The video game controller charging system of claim 1, wherein the at least one adapter comprises a plurality of adapters, each configured to electrically couple to a respective video game controller of a plurality of video game controllers, and the at least one recess comprises a plurality of recesses, wherein the video game controller charging system is configured to concurrently charge the plurality of video game controllers.

3. The video game controller charging system of claim 1, further comprising at least one docking bay supported by the base, each of the at least one docking bay comprising a pair of opposing surfaces and being open on opposite sides between the opposing surfaces, each of the at least one docking bay being configured to receive a video game controller of the at least one video game controller such that handle portions of the video game controller project outwardly from the open sides.

4. The video game controller charging system of claim 3, wherein each of the at least one recess is disposed within a respective docking bay of the at least one docking bay, and the at least one adapter is receivable in a respective one of the at least one recess such that the at least one electrical lead contacts the at least one electrical contact when the video game controller having the adapter attached thereto is received in the respective docking bay.

5. The video game controller charging system of claim 1, further comprising at least one spring coupled to the at least one electrical contact in a respective one of the at least one recess, the at least one spring being configured to bias the at least one electrical contact toward the at least one electrical lead when a respective adapter of the at least one adapter is received in the respective recess.

6. The video game controller charging system of claim 5, wherein the, respective adapter is receivable into the respective recess in a first direction, and the at least one spring is configured to bias the at least one electrical contact toward the at least electrical lead in a second direction opposite the first direction.

7. The video game controller charging system of claim 1, wherein each of the at least one adapter is receivable in a respective one of the at least one recess by drop-fit such that the at least one electrical lead contacts the at least one electrical contact i the respective recess without the use of a plug or a connector.

8. A video game controller charging system for charging, at least one video game controller, each having a female power input receptacle and handle portions at opposite sides of the female power input receptacle, the video game controller charging system comprising:

a base;
at least one docking bay supported by the base, each of the at least one docking bay comprising a pair of opposing surfaces and being open on opposite sides between the opposing surfaces, each of the at least one docking bay being configured to receive a video game controller of the at least one video game controller such that the handle portions of the video game controller project outwardly from the open sides;
at least one recess and at least one electrical contact in each of the at least one recess, each of the at least ne recess corresponding to a respective docking bay of the at least one docking bay;
a single power input interface;
at least one adapter, each comprising at least one electrical lead and being receivable in a respective one of the at least one recess such that the at least one electrical lead contacts the at least one electrical contact in the respective recess; and
at least one male DC port electrically coupleable to the single power input interface, each of the at least one male DC port being disposed on a respective adapter of the at least one adapter and being configured to electrically and mechanically couple to the female power input receptacle of a respective one of the at least one video game controller to provide DC power to the female power input receptacle without the use of external or retractable cable when the respective adapter is received in the respective recess, and such that the adapter may remain attached to the video game controller when the video game controller is in use during operation of a video game.

9. The video game controller charging system of claim 8, wherein each of the at least one recess is disposed within the respective docking bay of the at least one docking bay.

10. The video game controller charging system of claim 8, wherein the at least one adapter comprises a plurality of adapters, each configured to electrically couple to a respective video game controller of a plurality of video game controllers, the at least one docking bay comprises a plurality of docking bays, and the at least one recess comprises a plurality of recesses, wherein the video game controller charging system is configured to concurrently charge the plurality of video game controllers.

11. The video game controller charging system of claim 10, wherein the opposing surfaces of each of the docking bays are spaced apart from each other in a first direction, and docking bays of the plurality of docking bays are spaced apart from each other in the first direction.

12. The video game controller charging system of claim 8, further comprising at least one spring coupled to the at least one electrical contact in a respective one of the at least one recess, the at least one spring being configured to bias the at least one electrical contact toward the at least one electrical lead when a respective adapter of the at least one adapter is received in the respective recess.

13. The video game controller charging system of claim 12, wherein the respective adapter is receivable into the respective recess in a first direction, and the at least one spring is configured to bias the at least one electrical contact toward the at beast one electrical lead in a second direction opposite the first direction.

14. The video game controller charging system of claim 8, wherein each of the at least one adapter is receivable in a respective one of the at least one recess by drop-fit such that the at least one electrical lead contacts the at least one electrical contact in the respective recess without the use of a plug or a connector.

15. A video game controller charging system for charging video game controller having a power input port, the video game controller charging system comprising:
at least one adapter comprising:
a body;
a connector fixed to the body and configured to removably and electrically couple the adapter to the power input port of the video game controller, thereby mechanically mounting the body of the adapter to the video game controller via the power input port; and
at least one electrical lead electrically coupled to the connector via the body; and
a base comprising:
a power input for connection to a power supply; and
at least one docking bay defining a recess of a shape configured to mate with the adapter body and including at least one electrical contact electrically coupled to the power input and configured to electrically contact the at least one electrical lead of the adapter when the adapter body and recess are mated with one another,
wherein the at least one adapter includes a plurality of electrical leads and the at least one docking bay includes a corresponding plurality of electrical contacts, wherein the at least one adapter is of a shape that generally coincides with the shape of the recess of the at least one docking bay such that her the adapter is mated with the recess, the plurality of electrical contacts aligns with and electrically contacts the corresponding plurality of electrical leads.

16. The video game controller charging system of claim 15, wherein the at least one adapter comprises a plurality of adapters, each configured to electrically couple to a respective video game controller of a plurality of video game controllers, and the at least one docking bay comprises a plurality of docking bays, wherein the video game controller charging system is configured to concurrently charge the plurality of video game controllers.

17. The video game controller charging system of claim 16, wherein each of the at least one docking bay comprises a pair of opposing surfaces and being open on opposite sides between the opposing surfaces, each of the at least one docking bay being configured to receive a video game controller of the at least one video game controller such that handle portions of the video game controller project outwardly from the open sides.

18. The video game controller charging system of claim 16, further comprising at least one spring coupled to the at least one electrical contact in the recess, the at least one spring being configured to bias the at least one electrical contact toward the at least one electrical lead when a respective adapter of the at least one adapter is received in recess.

19. The video game controller charging system of claim 18, wherein the respective adapter is receivable into the recess a first direction, and the at least one spring is configured to bias the at least one electrical contact toward the at least one electrical lead in a second direction opposite the first direction.

20. The video game controller charging system of claim 1, wherein each of the at least one male DC port is disposed on an inwardly curved surface of the respective adapter to support the respective one of the at least one video game controller.

21. The video game controller charging system of claim 8, wherein each of the at least one male DC port is disposed on an inwardly curved surface of the respective adapter to support the respective one of the at least one video game controller.

22. The video game controller charging system of claim 16, wherein the connector is disposed on an inwardly curved surface of the body to support the video game controller.

\* \* \* \* \*

(12) EX PARTE REEXAMINATION CERTIFICATE (12186th)
United States Patent
Navid

(10) Number: US 9,705,344 C1
(45) Certificate Issued: *Dec. 14, 2022

(54) VIDEO GAME CONTROLLER CHARGING SYSTEM HAVING A DOCKING STRUCTURE

(71) Applicant: NYKO TECHNOLOGIES, INC., Los Angeles, CA (US)

(72) Inventor: Amir Navid, Sherman Oaks, CA (US)

(73) Assignee: OKYN HOLDINGS, INC., Westwood, CA (US)

Reexamination Request:
No. 90/014,984, Mar. 17, 2022

Reexamination Certificate for:
Patent No.: 9,705,344
Issued: Jul. 11, 2017
Appl. No.: 14/930,606
Filed: Nov. 2, 2015

(*) Notice: This patent is subject to a terminal disclaimer.

Related U.S. Application Data

(63) Continuation of application No. 14/158,703, filed on Jan. 17, 2014, now Pat. No. 9,174,121, which is a continuation of application No. 13/769,709, filed on Feb. 18, 2013, now Pat. No. 8,633,675, which is a continuation of application No. 13/417,147, filed on Mar. 9, 2012, now Pat. No. 8,536,832, which is a continuation of application No. 12/044,295, filed on Mar. 7, 2008, now Pat. No. 8,143,848, which is a continuation-in-part of application No. 11/581,137, filed on Oct. 13, 2006, now abandoned.

(60) Provisional application No. 60/982,364, filed on Oct. 24, 2007.

(51) Int. Cl.
*G07F 17/32* (2006.01)
*H02J 7/00* (2006.01)
*H01R 31/06* (2006.01)
*A63F 13/90* (2014.01)
*A63F 13/98* (2014.01)

(52) U.S. Cl.
CPC ............ *H01R 31/06* (2013.01); *A63F 13/90* (2014.09); *A63F 13/98* (2014.09); *H02J 7/0013* (2013.01); *H02J 7/0044* (2013.01); *H02J 7/0045* (2013.01); *H02J 2310/22* (2020.01)

(58) Field of Classification Search
None
See application file for complete search history.

(56) References Cited

To view the complete listing of prior art documents cited during the proceeding for Reexamination Control Number 90/014,984, please refer to the USPTO's Patent Electronic System.

*Primary Examiner* — Jeffrey R Jastrzab

(57) ABSTRACT

A video game controller charging system is provided. The video game controller charging system includes a base; at least one structure on the base for providing physical support to at least one video game controller while it is being charged; and at least one DC port on the base configured to couple to and provide DC power to a power input port of the at least one video game controller. The video game controller charging system may also include a current detector, a charging status indicator, at least one docking bay, and/or an AC-to-DC converter adapted to convert externally supplied power to the DC power provided to the power input port of at least one video game controller. The base of a charging station may include a recess having at least one electrical contact and a power input for connection to a power supply.

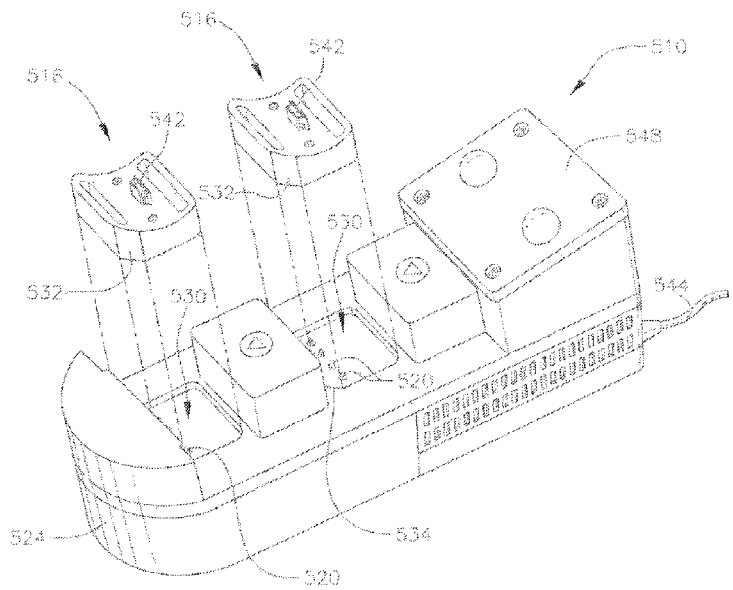

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1, 5-7, 15 and 20 is confirmed.

Claims 2-4, 8-14, 16-19, 21 and 22 were not reexamined.

\* \* \* \* \*